(12) United States Patent
Saitou

(10) Patent No.: US 8,320,253 B2
(45) Date of Patent: Nov. 27, 2012

(54) RADIO COMMUNICATION SYSTEM

(75) Inventor: Naoyuki Saitou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 12/860,243

(22) Filed: Aug. 20, 2010

(65) Prior Publication Data
US 2011/0051685 A1  Mar. 3, 2011

(30) Foreign Application Priority Data

Aug. 28, 2009  (JP) ................................. 2009-198643

(51) Int. Cl.
| | |
|---|---|
| H04L 12/28 | (2006.01) |
| H04J 3/08 | (2006.01) |
| H04W 4/00 | (2009.01) |
| H04W 36/00 | (2009.01) |

(52) U.S. Cl. ........ 370/235; 370/315; 370/338; 370/447; 455/436; 455/443
(58) Field of Classification Search .......... 370/229–230, 370/235, 252, 310–350, 437, 447–449, 461–463, 370/468, 477, 498; 455/431–453
See application file for complete search history.

(56) References Cited

U.S. PATENT DOCUMENTS

| | | | | |
|---|---|---|---|---|
| 7,047,009 | B2* | 5/2006 | Laroia et al. ................... | 455/437 |
| 7,869,829 | B2* | 1/2011 | Kurokawa ..................... | 455/561 |
| 2004/0097238 | A1 | 5/2004 | Hwang et al. | |
| 2007/0253372 | A1 | 11/2007 | Nakayasu | |
| 2008/0057934 | A1 | 3/2008 | Sung et al. | |
| 2009/0154424 | A1* | 6/2009 | Oyabu ........................... | 370/331 |
| 2010/0317345 | A1* | 12/2010 | Futaki et al. ................... | 455/436 |
| 2012/0040679 | A1* | 2/2012 | Worrall ........................ | 455/437 |
| 2012/0083274 | A1* | 4/2012 | Tajima et al. ................. | 455/436 |

FOREIGN PATENT DOCUMENTS

| | | |
|---|---|---|
| JP | 2000-269881 | 9/2000 |
| JP | 2004-159345 | 6/2004 |
| JP | 2007-295318 | 11/2007 |

(Continued)

OTHER PUBLICATIONS

Saleh Faruque, "High capacity cell planning based on fractional frequency reuse with optimum trunking efficiency", 48th IEEE Vehicular Technology Conference, 1998 (VTC 98), vol. 2, pp. 1458-1460, May 1998.

(Continued)

Primary Examiner — Tri H Phan
(74) Attorney, Agent, or Firm — Katten Muchin Rosenman LLP

(57) ABSTRACT

A radio communication system includes: a first base station for communicating with a mobile station in a first area; and a second base station for communicating with the mobile station in a second area; the first base station including: a first receiving unit for receiving connection control information from the second station; a first setup unit for generating scheduling information; and a first transmitting unit for transmitting the generated scheduling information to the second base station and for transmitting the data decided to send to the mobile station on the basis of the scheduling information; the second base station including: a second transmitting unit for transmitting the connection control information and for transmitting the data decided to send to the mobile station on the basis of the scheduling information; and a second receiving unit for receiving the scheduling information from the first base station.

5 Claims, 19 Drawing Sheets

FOREIGN PATENT DOCUMENTS

JP 2008-61250 3/2008

OTHER PUBLICATIONS

"Fractional Frequency Reuse in Mobile WiMAX", retrieved Jul. 17, 2009 from http://www.conniq.com/WiMAX/fractional-frequency-reuse.htm.

"Flexible Fractional Frequency Reuse Approach", 3GPP TSG RAN WG1 Meeting #43 (R1-051341), Nov. 7-11, 2005.

Satoshi Konishi et al., "A Study on the Fractional Frequency Reuse for the OFDMA-based cellular systems", The Institute of Electronics, Information and Communication Engineers, Communication Society Conference, B-5-59, Sep. 2007.

* cited by examiner

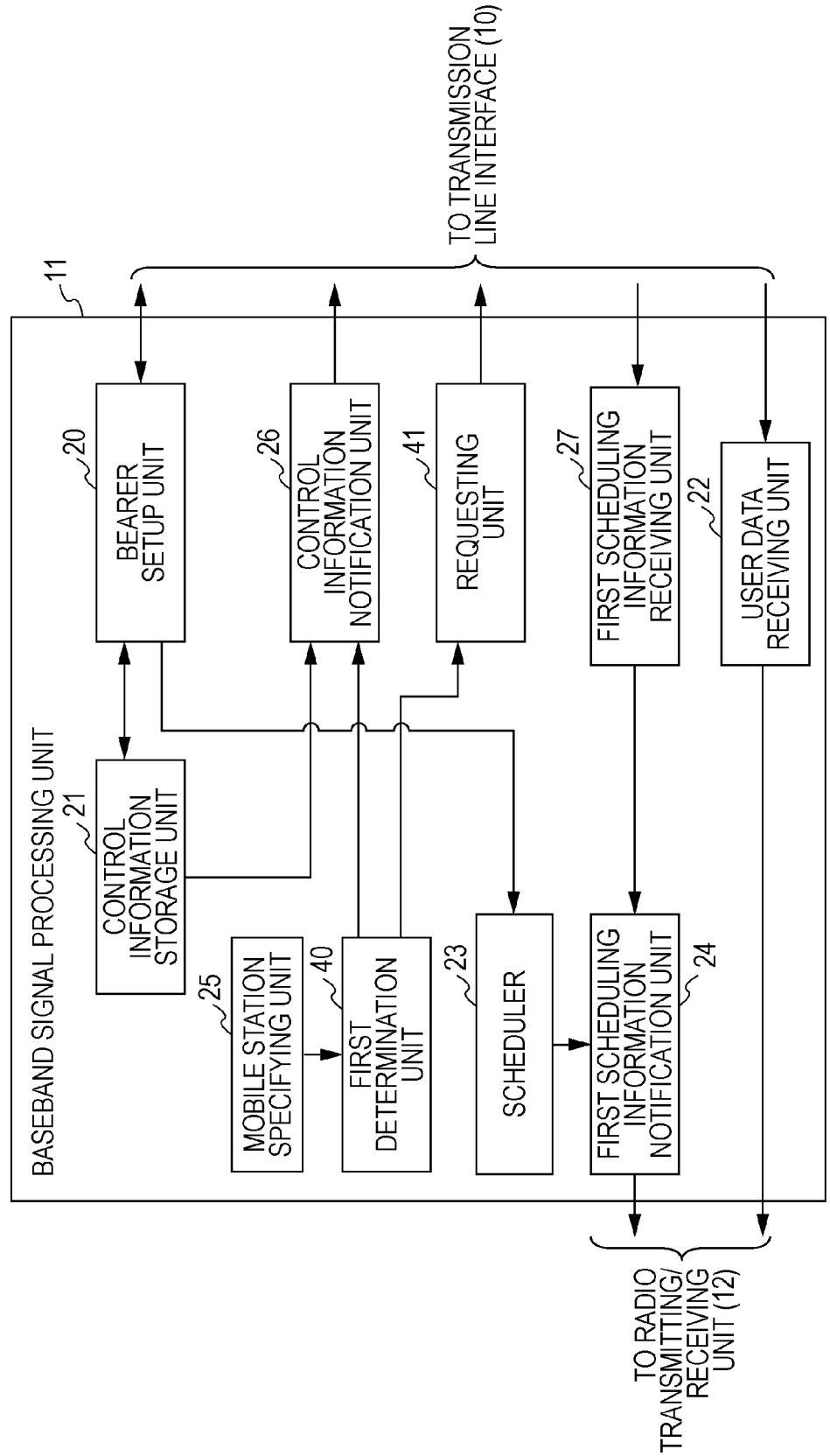

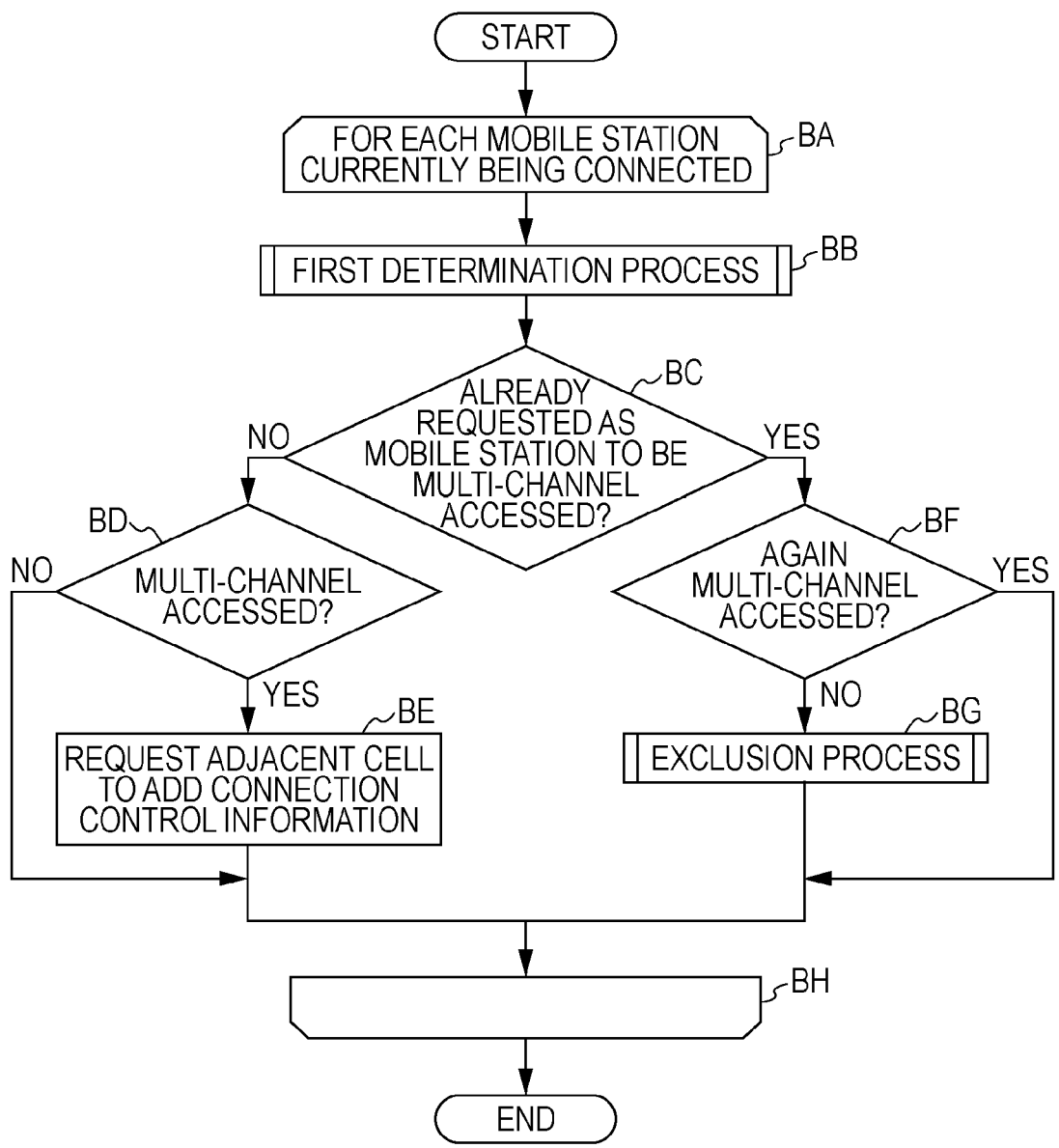

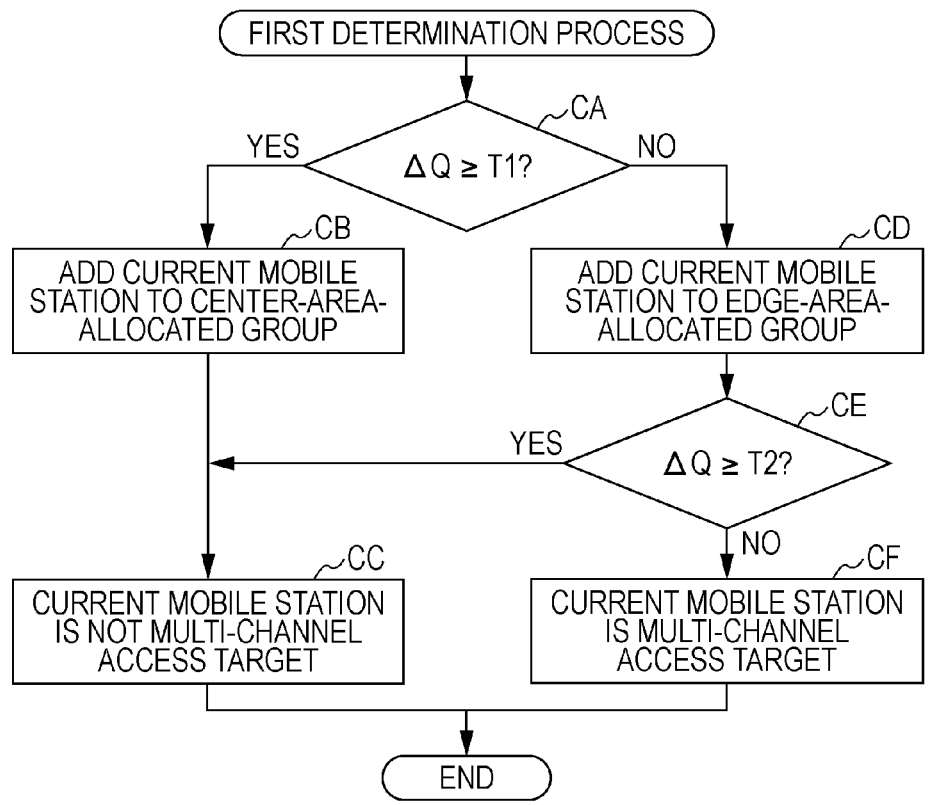
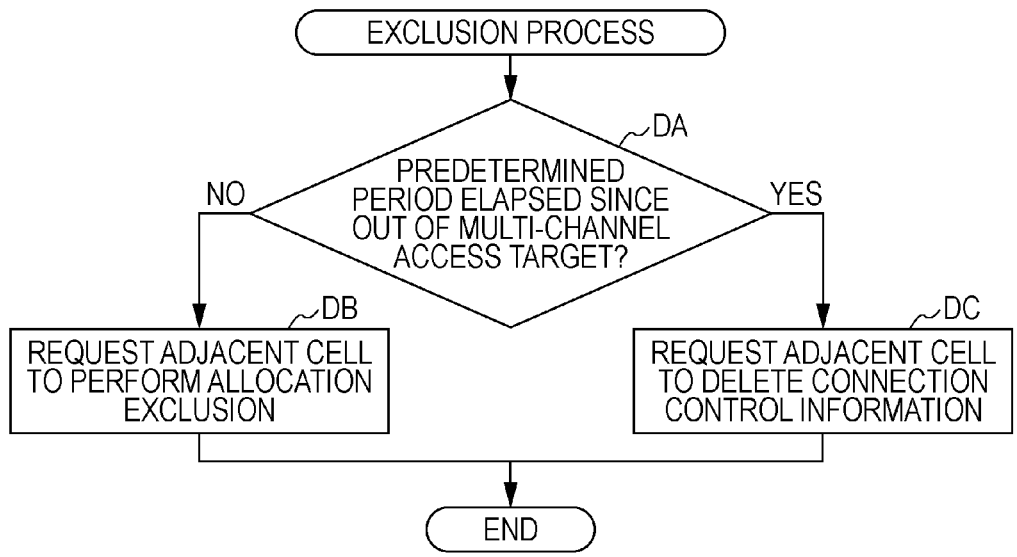

RADIO COMMUNICATION SYSTEM

CROSS-REFERENCE TO RELATED APPLICATION

This application is based upon and claims the benefit of priority of the prior Japanese Patent Application No. 2009-198643 filed on Aug. 28, 2009, the entire contents of which are incorporated herein by reference.

FIELD

Embodiments as discussed herein relate to a radio communication system.

BACKGROUND

Communication schemes in which radio resources are divided in an edge area relatively near the edge of a cell in a radio communication system and are shared with adjacent cells have been proposed. Examples of the communication schemes include fractional frequency reuse (FFR). The above communication schemes are also applied when one cell is divided into a plurality of sectors, in order to share radio resources between adjacent sectors. In the following description, for ease of understanding, the area covered by a base station device is generally referred to as a "cell" regardless of whether the minimum unit of the covered area is "cell" or "sector".

A method has been proposed including receiving an uplink signal via a radio antenna of a mobile communication base station; extracting inter-cell interference amount information from the received uplink signal; generating uplink control information based on the inter-cell interference amount information; and transmitting the generated uplink control information to a mobile communication terminal located in an adjacent cell, wherein the terminal schedules an uplink resource by referring to the uplink control information.

Also proposed has been a mobile communication system which enables radio base stations to communicate with each other using a link between the base stations, in which the radio base stations are notified of information about radio environments of adjacent cells and in which the latest version of the information about the radio environments is stored in a memory of each of the radio base stations so that each radio base station can perform handover control, transmission power control, traffic control, and the like by referring to the information stored in the memory.

Also proposed has been a code division multiple access (CDMA) mobile communication system in which traffic control is performed independently for the uplink and the downlink in accordance with transmission power control based on communication quality so that different base stations can be selected for the uplink and the downlink.

Also proposed has been a method for reusing orthogonal frequency division multiplex frequency resources in a mobile communication system including a plurality of base stations that communicate with terminals using the orthogonal frequency division multiplex method. This method includes dividing orthogonal frequency division multiplex frequency resources available to each base station into at least four groups; setting frequency reuse distance values so that each of the obtained groups of orthogonal frequency division multiplex frequency resources can have the same frequency reuse distance value or different frequency reuse distance values; and sequentially allocating the groups of orthogonal frequency division multiplex frequency resources to cell areas of each base station in such a manner that a group of orthogonal frequency division multiplex frequency resources having a small frequency reuse distance value is allocated to a nearby cell area and a group of orthogonal frequency division multiplex frequency resources having a large frequency reuse distance value is allocated to a remote cell area.

Examples of related art are as follows: Japanese Laid-open Patent Publications No. 2008-61250, No. 2007-295318, No. 2000-269881, and No. 2004-159345; S. Faruque, "High capacity cell planning based on fractional frequency reuse with optimum trunking efficiency", the 48th IEEE Vehicular Technology Conference, 1998 (VTC 98), vol. 2, pp. 1458-1460, May 1998; "Fractional Frequency Reuse in Mobile WiMAX", accessed Jul. 17, 2009 at http://www.conniq.com/WiMAX/fractional-frequency-reuse.htm; "Flexible Fractional Frequency Reuse Approach", Samsung, 3GPP TSG RAN WG1 Meeting #43 (R1-051341), Nov. 7-11, 2005; and KONISHI Satoshi et al., "A Study on the Fractional Frequency Reuse for the OFDMA-based cellular systems", the Institute of Electronics, Information and Communication Engineers, Communication Society Conference, B-5-59, September 2007.

In an edge area where radio resources are divided and shared between adjacent cells, the radio propagation distance between a base station device and a mobile station device is long. Thus, the communication throughput between the base station device and the mobile station device is reduced. In the edge area, furthermore, radio resources are divided and shared with the edge area of an adjacent cell. Thus, the amount of radio resources allocated to each edge area is reduced and therefore the communication throughput between the base station device and the mobile station device is reduced.

SUMMARY

According to an aspect of the embodiment, a radio communication system for communicating with a mobile station includes: a first base station for communicating with the mobile station in a first area; and a second base station for communicating with the mobile station in a second area, a part of the second area being same with the first area; the first base station comprising: a first receiving unit for receiving connection control information from the second station, the resource including information indicating data to be sent from the second base station to the mobile station; a first setup unit for generating scheduling information for deciding whether the data sent to the mobile station is sent from the first base station or not, on the basis of the received connection control information and a communication resource that can be used to send data from the first base station to the mobile station; and a first transmitting unit for transmitting the generated scheduling information to the second base station and for transmitting the data decided to send to the mobile station on the basis of the scheduling information; the second base station comprising: a second transmitting unit for transmitting the connection control information and for transmitting the data decided to send to the mobile station on the basis of the scheduling information; and a second receiving unit for receiving the scheduling information from the first base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram describing a second example configuration of the base band signal processing unit in the first base station device;

FIG. 8 is a diagram describing a first example of a process performed by the first base station device;

FIG. 9 is a diagram describing a first determination process illustrated in FIG. 8;

FIG. 10 is a diagram describing an exclusion process illustrated in FIG. 8;

DESCRIPTION OF EMBODIMENTS

Figure 1:
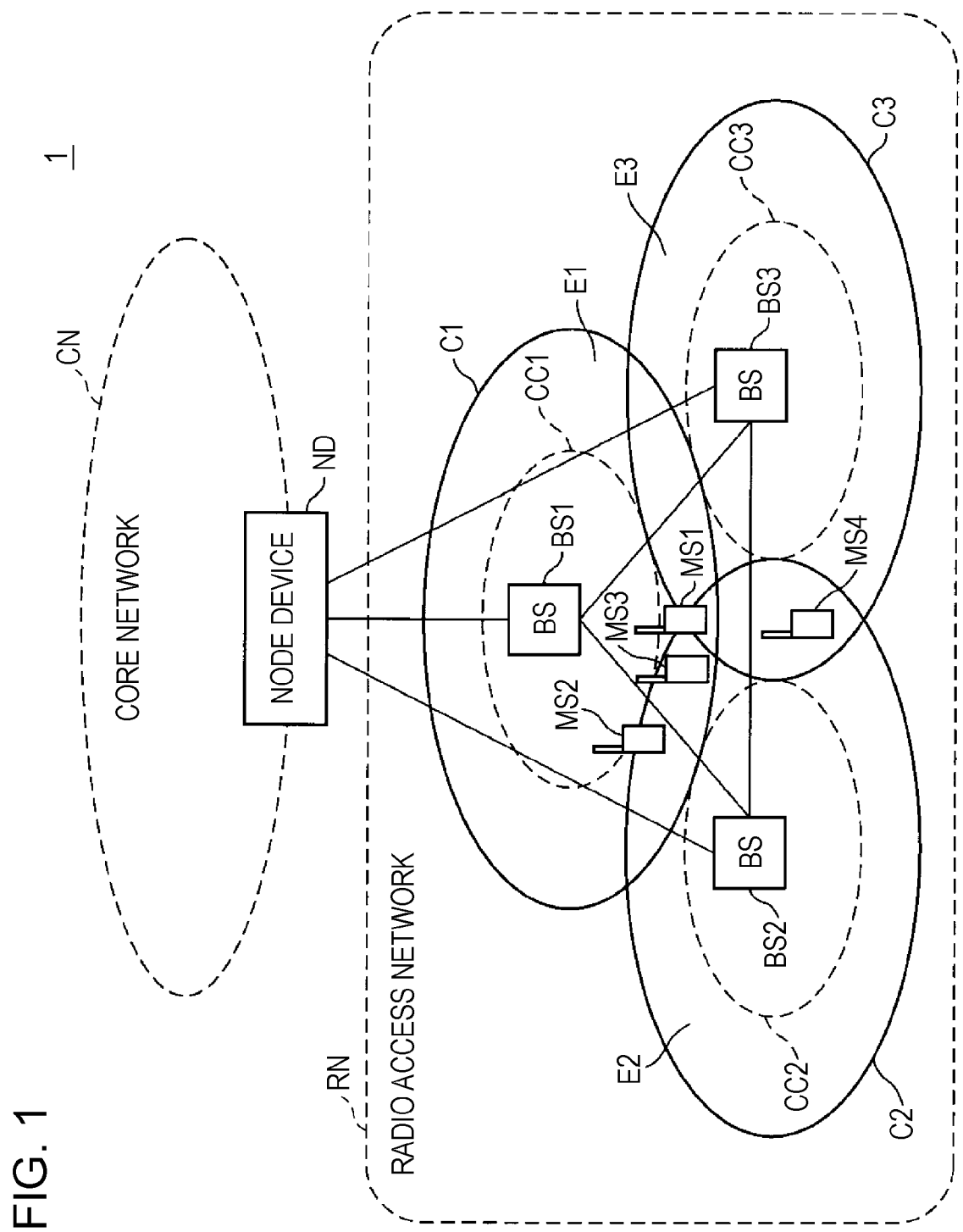
FIG. 1 is a configuration diagram of a radio communication system according to a first exemplary embodiment.

Exemplary embodiments of the present invention will be described hereinafter with reference to the accompanying drawings. FIG. 1 is a configuration diagram of a radio communication system according to a first exemplary embodiment. Reference numeral 1 denotes a radio communication system, reference symbol CN denotes a core network, reference symbol RN denotes a radio access network, reference symbol ND denotes a node device, and reference symbols BS1, BS2, and BS3 denote a first base station device, a second base station device, and a third base station device, respectively. Reference symbols MS1, MS2, MS3, and MS4 denote mobile station devices, reference symbols C1, C2, and C3 denote cells, reference symbols CC1, CC2, and CC3 denote center areas, and reference symbols E1, E2, and E3 denote edge areas. The first to third base station devices BS1 to BS3 may be collectively referred to as "base station devices BS". Further, the mobile station devices MS1 to MS4 may be collectively referred to as "mobile station devices MS".

The radio communication system 1 includes the core network CN and the radio access network RN. The core network CN is a backbone network connected to a wired network, and includes the node device ND that transfers user data between the core network CN and the mobile station devices MS1 to MS4.

The radio access network RN is a network for connecting the mobile station devices MS1 to MS4, which are owned by users, to a network, and includes the first to third base station devices BS1 to BS3 that cover the cells C1 to C3, respectively, and the mobile station devices MS1 to MS4.

The cells C1 to C3 have the center areas CC1 to CC3, respectively, each of which is an area where radio resources are not divided or shared with the center area of another adjacent cell, and a frequency reuse factor (FRF) of "1" is set in the center areas CC1 to CC3. The cells C1 to C3 have the edge areas E1 to E3, respectively, each of which is an area where radio resources are divided and shared with the edge area of another adjacent cell. In each of the edge areas E1 to E3, a frequency reuse factor is equal to the number of cells, "n", between which radio resources are divided and shared.

The radio communication system 1 may use, for example, the Orthogonal Frequency Division Multiple Access (OFDMA) method as a downlink multiple access method. Further, for example, FFR may be used to divide and share radio resources between adjacent cells in the edge areas E1 to E3.

The node device ND sends the same data to the base station devices BS1 to BS3. The node device ND may send data in accordance with the schedule information received from each of the base stations.

Figure 2:
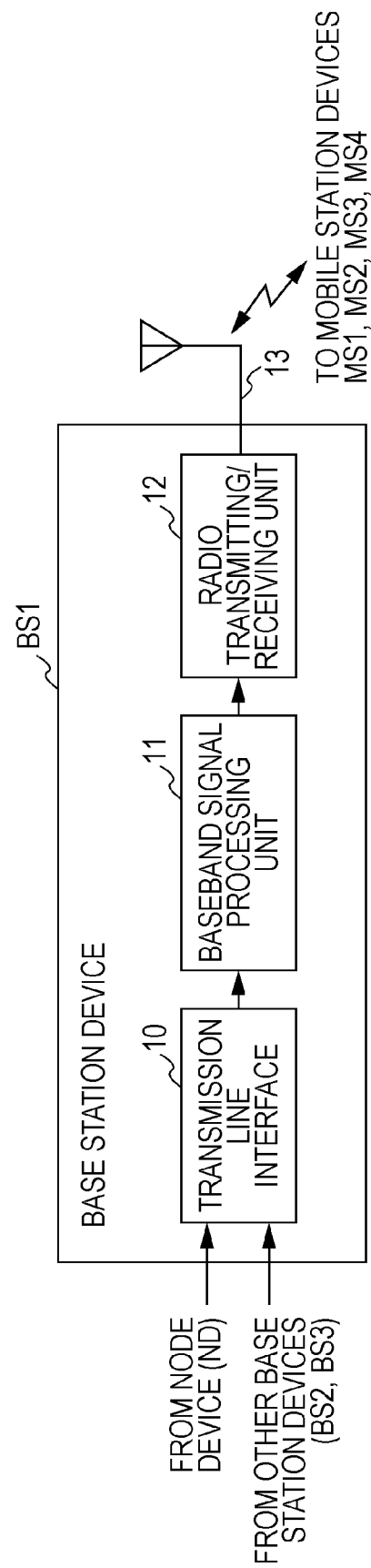
FIG. 2 is a configuration diagram of a base station device according to an exemplary embodiment.

FIG. 2 is a configuration diagram of the first base station device BS1 according to an exemplary embodiment. Each of the second and third base station devices BS2 and BS3 may also have a configuration similar to that of the first base station device BS1. Reference numeral 10 denotes a transmission line interface, reference numeral 11 denotes a base band signal processing unit, reference numeral 12 denotes a radio transmitting/receiving unit, and reference numeral 13 denotes a radio communication antenna.

The transmission line interface 10 transmits and receives signals to and from an upper-level device such as the node device ND included in the core network CN, and transmits and receives signals to and from the adjacent other base station devices BS2 and BS3. The radio transmitting/receiving unit 12 performs a conversion process between a radio frequency signal transmitted to and received from a mobile station device MS and a baseband signal.

The functionality of the base band signal processing unit 11 will now be described. In the following description, a base station device BS that covers one of two adjacent cells is represented by the first base station device BS1, and a base station device BS that covers the other cell is represented by the second base station device BS2. For example, the first base station device BS1 may be a base station device BS that covers the cell C1 identified using cell search processing as a cell where the mobile station device MS is located. The second base station device BS2 may be a base station device BS that covers the cell C2 adjacent to the cell C1 of the first base station device BS1.

Figure 3:
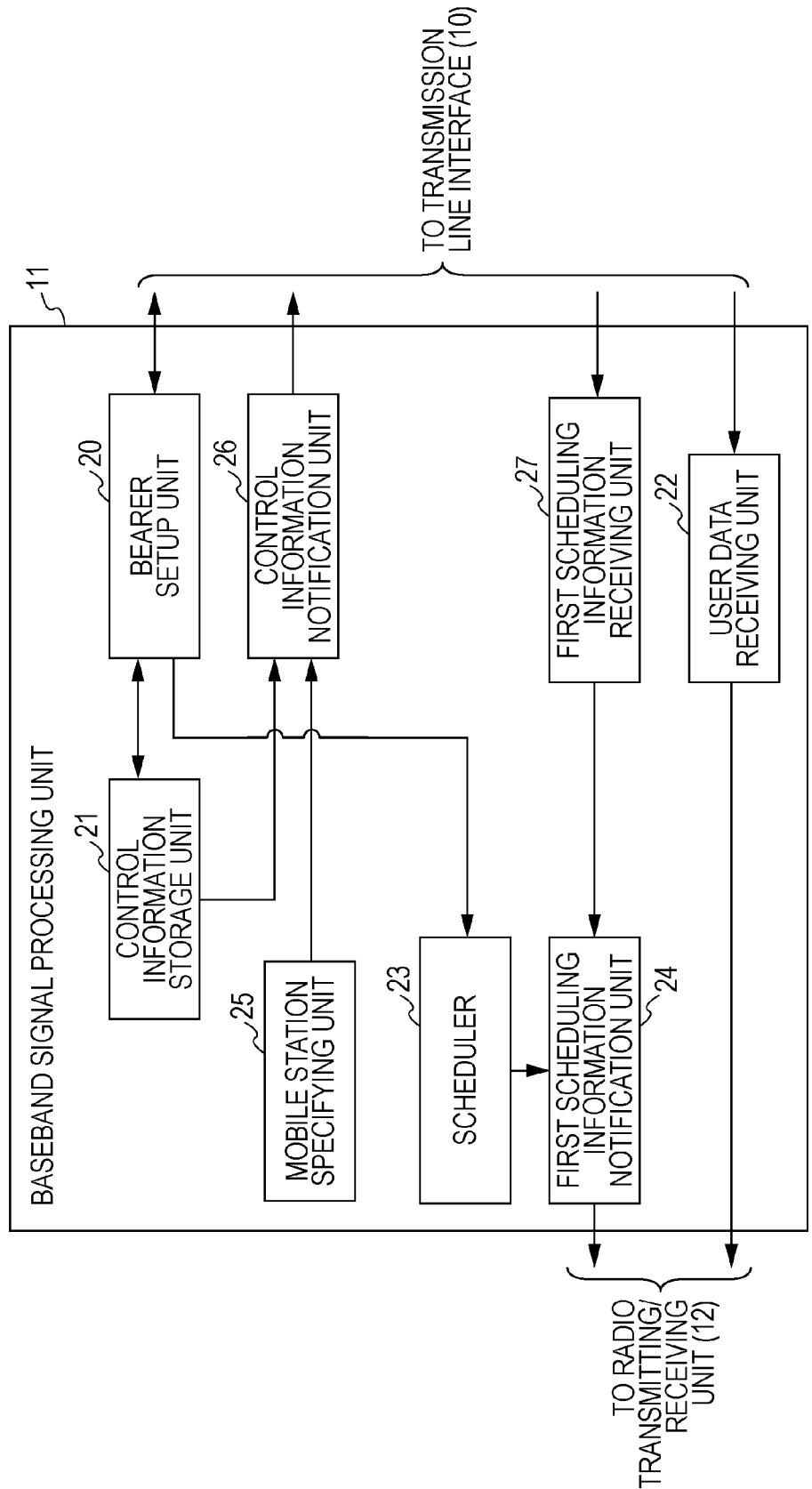
FIG. 3 is a diagram describing a first example configuration of a base band signal processing unit in a first base station device.

A process performed by the base band signal processing unit 11 when a base station device BS operates as the first base station device BS1 will now be described. FIG. 3 is a diagram describing a first example configuration of the base band signal processing unit 11 in the first base station device BS1. Reference numeral 20 denotes a bearer setup unit, reference numeral 21 denotes a control information storage unit, reference numeral 22 denotes a user data receiving unit, reference numeral 23 denotes a scheduler, and reference numeral 24 denotes a first scheduling information notification unit. Reference numeral 25 denotes a mobile station specifying unit, reference numeral 26 denotes a control information notification unit, and reference numeral 27 denotes a first scheduling information receiving unit.

The base band signal processing unit 11 includes the bearer setup unit 20, the control information storage unit 21, the user data receiving unit 22, the scheduler 23, and the first scheduling information notification unit 24. The base band signal processing unit 11 further includes the mobile station specifying unit 25, the control information notification unit 26, and the first scheduling information receiving unit 27.

The control information storage unit 21 stores predetermined connection control information for connecting a mobile station device MS connected to the first base station device BS1 to the core network CN and for receiving user data to be transmitted to the mobile station device MS from the core network CN.

The predetermined connection control information includes various types of information which are determined, as appropriate, in accordance with the communication scheme or communication protocol adopted by the radio communication system 1. For example, the connection control information may include user management information, radio bearer information and/or authentication information. For example, the user management information may be information including identifiers for identifying individual mobile station devices MS. Further, for example, the radio bearer information may include setup information about a radio bearer set up between a mobile station device MS and the core network CN.

The bearer setup unit 20 sets up a radio bearer in order to receive the user data to be transmitted to the mobile station device MS from the core network CN in accordance with the connection control information stored in the control information storage unit 21. Through the radio bearer set up by the bearer setup unit 20, the user data to be transmitted to the mobile station device MS is transmitted from the node device ND to the base station device BS1. The user data receiving unit 22 receives the user data transmitted from the node device ND. The user data received by the user data receiving unit 22 is transmitted to the mobile station device MS using a radio resource determined by the scheduler 23.

The scheduler 23 allocates a radio resource that is used to transmit the user data to the mobile station device MS. The first scheduling information notification unit 24 transmits scheduling information that specifies the radio resource allocated for the transmission of the user data to the mobile station device MS to the mobile station device MS. The scheduling information may include information indicating a radio resource used to transmit the user data to the mobile station device MS, such as a time slot or a frequency band, and information indicating a modulation scheme, a code rate, and a packet size.

The mobile station specifying unit 25 determines whether each mobile station device MS connected to the first base station device BS1 is located in the edge area E1 or the center area CC1. For example, the mobile station specifying unit 25 may determine in which of the edge area E1 and the center area CC1 each mobile station device MS is located on the basis of the quality of communication between the first base station device BS1 and the mobile station device MS and the quality of communication between the second base station device BS2 and the mobile station device MS.

For example, when a difference $\Delta Q$ between the quality of communication between the first base station device BS1 and the mobile station device MS and the quality of communication between the second base station device BS2 and the mobile station device MS is greater than or equal to a predetermined threshold value T1, the mobile station specifying unit 25 may determine that the mobile station device MS is located in the center area CC1. When the difference $\Delta Q$ in the quality of communication is less than the threshold value T1, the mobile station specifying unit 25 may determine that the mobile station device MS is located in the edge area E1. For convenience of description, a mobile station device MS that is determined to be located in an edge area is represented by the mobile station device MS1.

For example, the reception correlation power at which a specific synchronization signal (cell specific reference signal) (SCH) transmitted from each base station device BS is received by a mobile station device MS may be used as the index of the quality of communication between the base station device BS and the mobile station device MS. Alternatively, for example, a signal to interference plus noise ratio (SINR) that is based on the reception correlation power of a cell specific reference signal transmitted from each base station device BS may be used as the index of the quality of communication.

The control information notification unit 26 transmits the connection control information about the mobile station device MS1, which is stored in the control information storage unit 21, to the adjacent second base station device BS2. The first scheduling information receiving unit 27 receives the scheduling information of the radio resource allocated by the second base station device BS2 for the transmission of the user data to the mobile station device MS1, from the second base station device BS2 to which the connection control information has been transmitted.

The first scheduling information notification unit 24 transmits scheduling information allocated by the first base station device BS1 and the scheduling information received from the second base station device BS2 to the mobile station device MS using a control channel in which the scheduling information is transmitted from the first base station device BS1 to the mobile station device MS.

Figure 4:
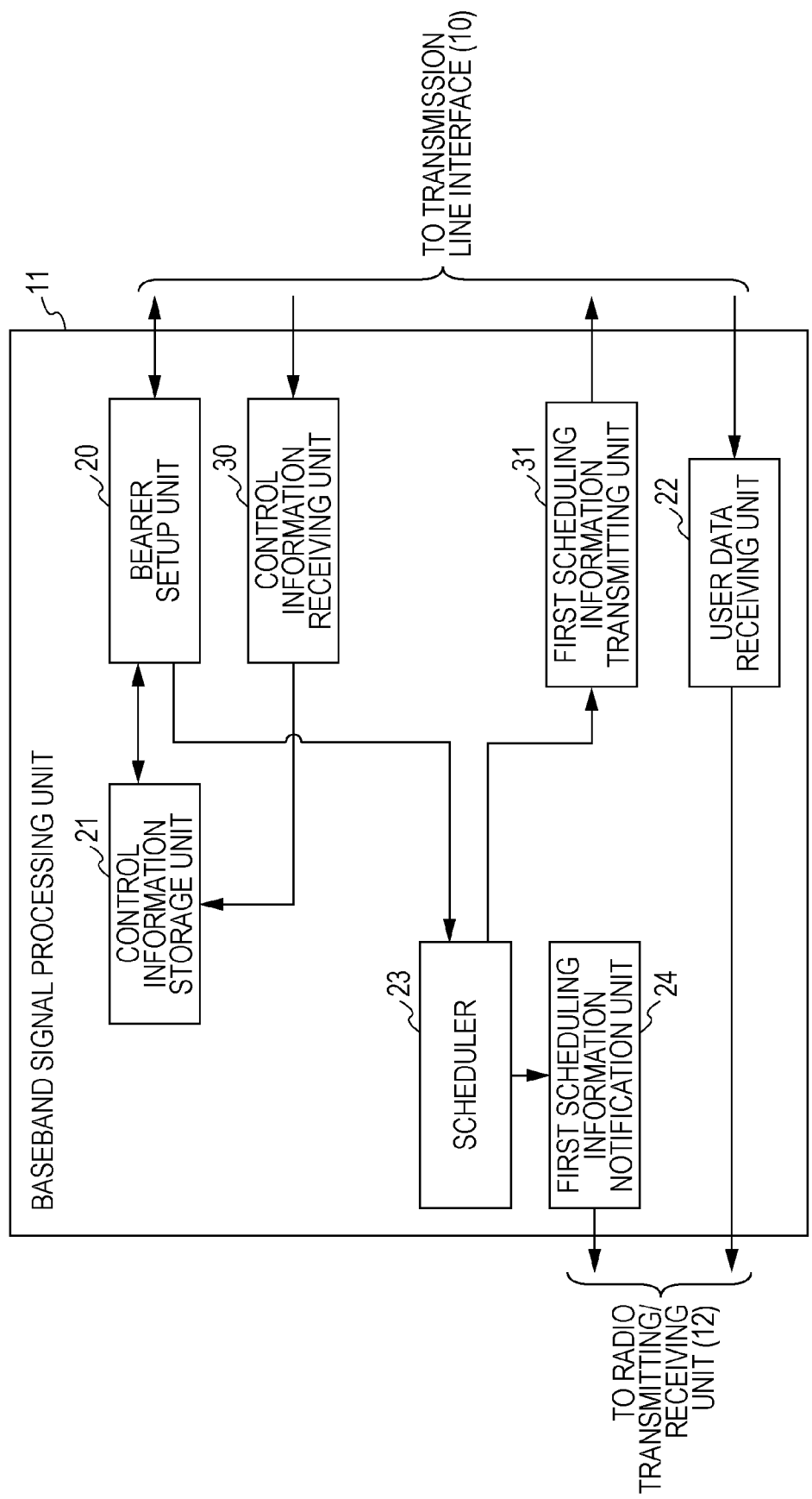
FIG. 4 is a diagram describing a first example configuration of a base band signal processing unit in a second base station device.

Next, a process performed by the base band signal processing unit 11 when a base station device BS operates as the second base station device BS2 will be described. FIG. 4 is a diagram describing a first example configuration of the base band signal processing unit 11 in the second base station device BS2.

Note that a base station device BS may operate as either the first base station device BS1 or the second base station device BS2. Therefore, a base station device BS may have both configurations of the first base station device BS1 and the second base station device BS2 illustrated in FIGS. 3 and 4, respectively. Similarly, also in the following other exemplary embodiments, a base station device BS may have both configurations of the first base station device BS1 and the second base station device BS2. Elements similar to the elements illustrated in FIG. 3 are assigned the same reference numerals as the reference numerals used in FIG. 3.

Reference numeral 30 denotes a control information receiving unit, and reference numeral 31 denotes a first scheduling information transmitting unit. The base band signal processing unit 11 includes the bearer setup unit 20, the control information storage unit 21, the user data receiving unit 22, the scheduler 23, the first scheduling information notification unit 24, the control information receiving unit 30, and the first scheduling information transmitting unit 31.

The control information receiving unit 30 receives the connection control information about the mobile station device MS1 transmitted from the first base station device BS1. The second base station device BS2 determines the possibility of transmission of user data from the second base station device BS2 to the mobile station device MS1, and sends a determination result to the first base station device BS1.

When the transmission of user data from the second base station device BS2 to the mobile station device MS1 is performed, the connection control information received by the control information receiving unit 30 is stored in the control information storage unit 21. The bearer setup unit 20 sets up a radio bearer in order to receive the user data to be transmitted to the mobile station device MS1 from the core network CN in accordance with the connection control information stored in the control information storage unit 21.

The bearer setup unit 20 may set up a radio bearer so that the user data transmitted from the first base station device BS1 can be different from the user data transmitted from the second base station device BS2. Thus, the control information notification unit 26 of the first base station device BS1 may transmit setup information about another radio bearer different from the radio bearer that is to be set up by the first base station device BS1 to the second base station device BS2.

The first base station device BS1 may include a bearer specifying information transmitting unit that transmits information or standard for specifying a radio bearer of the mobile station device MS1, through which the second base station device BS2 is to perform communication, to the second base station device BS2. The second base station device BS2 may include a bearer specifying information receiving unit that receives information or standard for specifying the radio bearer from the first base station device BS1. The bearer setup unit 20 of the second base station device BS2 may determine a radio bearer to be set up in accordance with the information or standard. The cooperation between the first base station device BS1 and the second base station device BS2 to specify radio bearers through which the base station devices BS1 and BS2 are to perform communication enables different user data to be transmitted from the base station devices BS1 and BS2.

The scheduler 23 allocates a radio resource used to transmit user data to the mobile station device MS1. The user data to the mobile station device MS1, which is received by the user data receiving unit 22, is transmitted to the mobile station device MS1 using the radio resource determined by the scheduler 23.

The first scheduling information transmitting unit 31 transmits scheduling information which specifies the radio resource that is allocated by the scheduler 23 and that is used to transmit user data to the mobile station device MS1 to the first base station device BS1. As described above, the first scheduling information notification unit 24 of the first base station device BS1 notifies the mobile station device MS1 of the scheduling information transmitted from the second base station device BS2 to the first base station device BS1. Thus, the mobile station device MS1 can receive the user data transmitted from the second base station device BS2.

Figure 5:
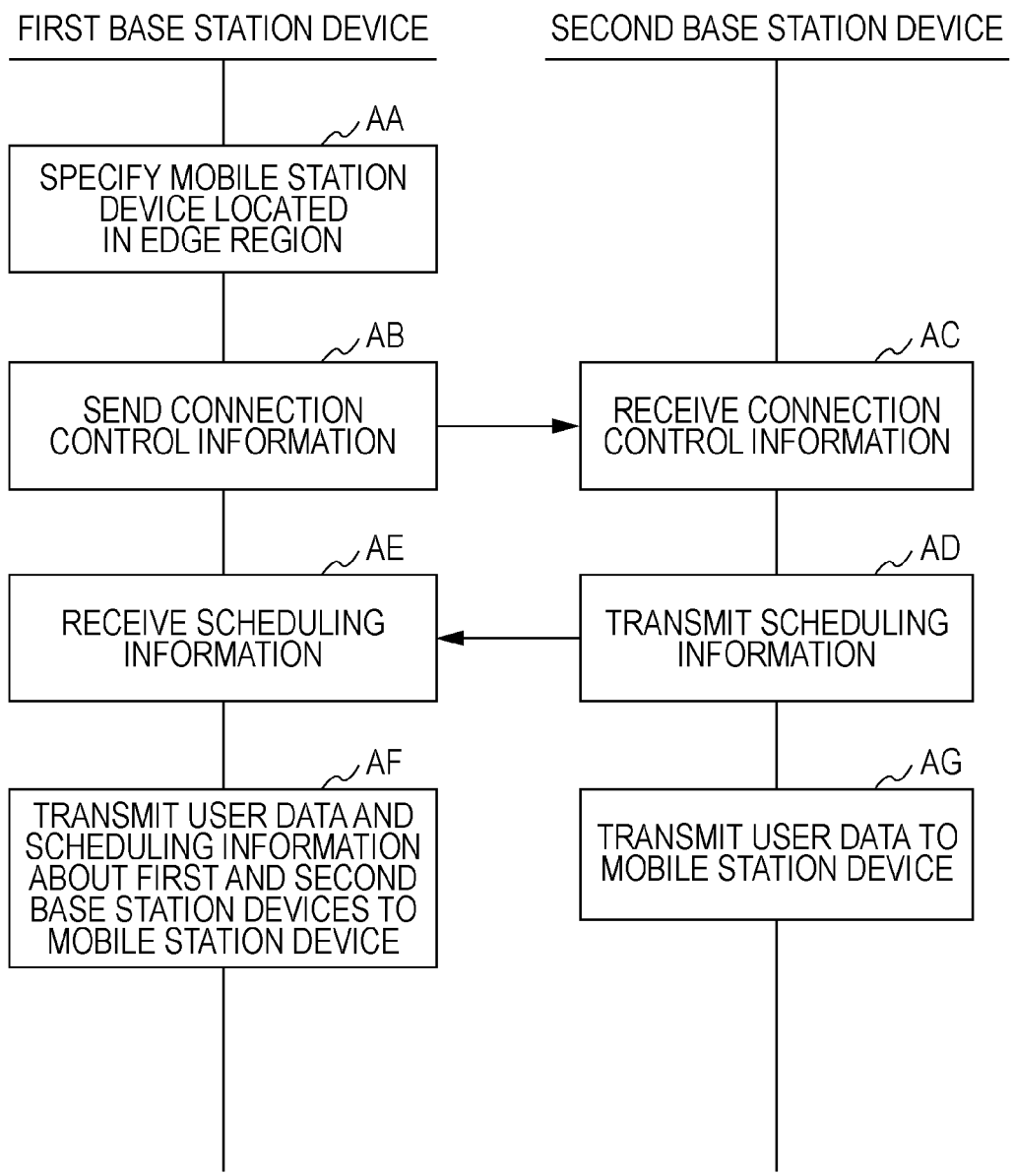
FIG. 5 is a diagram describing a first example of a process performed by the first base station device and the second base station device.

FIG. 5 is a diagram describing a first example of a process performed by the first base station device BS1 and the second base station device BS2. In another embodiment, the operations in Operations AA to AG described below may be implemented as steps. In Operation AA, the mobile station specifying unit 25 of the first base station device BS1 specifies the mobile station device MS1 located in the edge area E1.

In Operation AB, the control information notification unit 26 of the first base station device BS1 transmits connection control information about the mobile station device MS1 to the adjacent second base station device BS2. In Operation AC, the control information receiving unit 30 of the second base station device BS2 receives the connection control information about the mobile station device MS1.

In Operation AD, the scheduler 23 of the second base station device BS2 allocates a radio resource used to transmit user data from the second base station device BS2 to the mobile station device MS1. The first scheduling information transmitting unit 31 transmits scheduling information which specifies the radio resource allocated by the scheduler 23 to the first base station device BS1.

In Operation AE, the first scheduling information receiving unit 27 of the first base station device BS1 receives the scheduling information transmitted from the second base station device BS2. In Operation AF, the first scheduling information notification unit 24 of the first base station device BS1 notifies the mobile station devices MS of the scheduling information using control channels in which the scheduling information is transmitted from the first base station device BS1 to the mobile station devices MS. In this case, the first scheduling information notification unit 24 transmits the scheduling information allocated by the first base station device BS1 and the scheduling information received from the second base station device BS2 to the mobile station devices MS. Further, the first base station device BS1 transmits user data to the mobile station device MS1 using the radio resource allocated by the scheduler 23 of the first base station device BS1.

In Operation AG, the second base station device BS2 transmits user data to the mobile station device MS1 using the radio resource allocated by the scheduler 23 of the second base station device BS2.

Figure 6A:
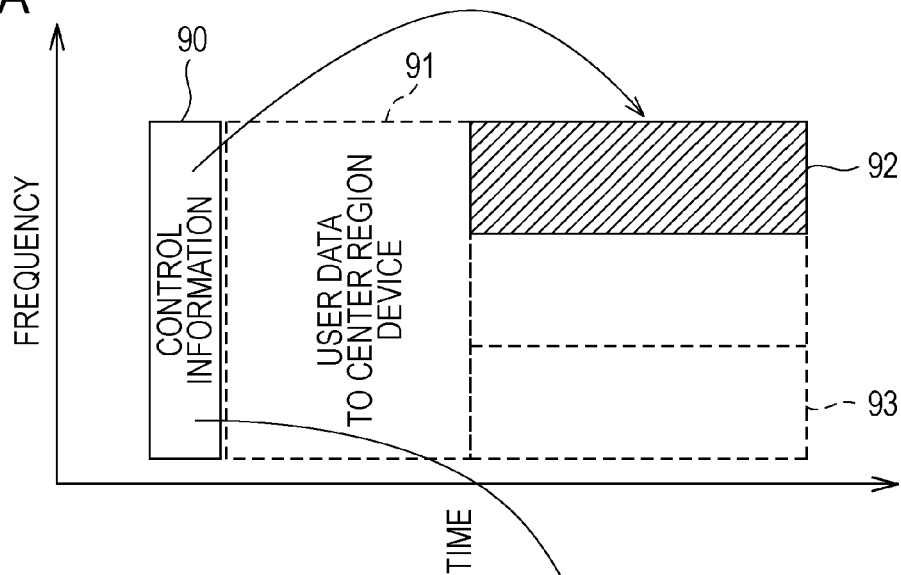
FIG. 6A is a diagram describing an example of a transmission frame sent from the first base station device to a mobile station device.
Figure 6B:
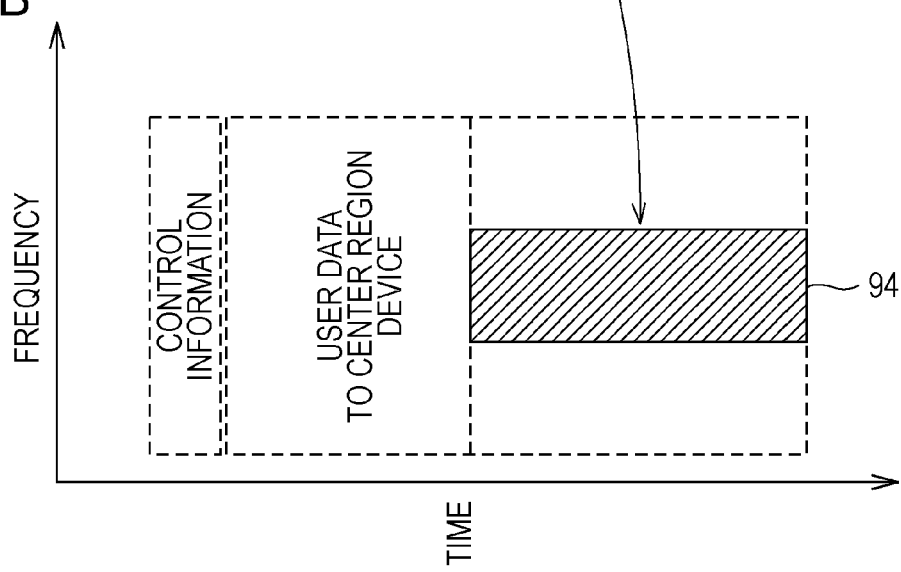
FIG. 6B is a diagram describing an example of a transmission frame sent from the second base station device to a mobile station device.

FIG. 6A is a diagram describing an example of a transmission frame sent from the first base station device BS1 to the mobile station device MS1, and FIG. 6B is a diagram describing an example of a transmission frame sent from the second base station device BS2 to the mobile station device MS1. Reference numeral 90 denotes control information transmitted from the first base station device BS1 to each mobile station device MS, and reference numeral 91 denotes user data transmitted to a mobile station device MS located in the center area CC1.

Reference numeral 92 denotes user data transmitted from the first base station device BS1 to the mobile station device MS1, and reference numeral 93 denotes user data transmitted to other mobile station devices MS located in the edge area E1. Reference numeral 94 denotes user data transmitted from the second base station device BS2 to the mobile station device MS1.

Radio resources used to transmit data to the mobile station devices MS located in the edge area E1 are divided and shared between the first base station device BS1 and the second base station device BS2. Therefore, the radio resources 92 and 94 that are used to transmit data from the first base station device BS1 to the mobile station device MS1 and from the second base station device BS2 to the mobile station device MS1, respectively, do not overlap. Thus, even when the transmission frames illustrated in FIGS. 6A and 6B arrive at the mobile station device MS1 at the same time, the user data received from the first base station device BS1 and the user data received from the second base station device BS2 do not interfere with each other.

The scheduling information which specifies the radio resources 92 and 94 is included in the control information 90 transmitted from the first base station device BS1 to the mobile station device MS1. The mobile station device MS1 demodulates and decodes the control information 90 addressed to the mobile station device MS1, thereby receiving the user data transmitted from the base station device BS1 and the user data transmitted from the base station device BS2.

According to the present exemplary embodiment, data can be transmitted to mobile station devices MS located in an edge area using a physical channel different from that of a plurality of adjacent base station devices BS. Thus, the throughput of data transmission to the mobile station devices MS located in the edge area is increased.

Subsequently, another process performed by the base band signal processing unit 11 when a base station device BS operates as the first base station device BS1 will be described. FIG. 7 is a diagram describing a second example configuration of the base band signal processing unit 11 in the first base station device BS1. Reference numeral 40 denotes a first determination unit, and reference numeral 41 denotes a requesting unit. Elements similar to the elements illustrated in FIG. 3 are assigned the same reference numerals as the reference numerals used in FIG. 3. The base band signal processing unit 11 includes the first determination unit 40 and the requesting unit 41.

The first determination unit 40 determines the possibility of transmission of user data from the second base station device BS2 to a mobile station device MS determined to be located in the edge area E1 by the mobile station specifying unit 25. For convenience of description, the mobile station device MS to which user data is determined to be transmitted from the second base station device BS2 is represented by the mobile station device MS2.

The first determination unit 40 may determine the possibility of transmission of user data from the second base station device BS2 to the mobile station device MS2 in accordance with, for example, the quality of communication between the first base station device BS1 and the mobile station device MS2 and the quality of communication between the second base station device BS2 and the mobile station device MS2. For example, the first determination unit 40 may determine the possibility of transmission of user data from the second base station device BS2 to the mobile station device MS2 in accordance with whether or not the difference ΔQ between the quality of communication between the first base station device BS1 and the mobile station device MS2 and the quality of communication between the second base station device BS2 and the mobile station device MS2 is less than a predetermined threshold value T2.

The first determination unit 40 may add, for example, the condition that the quality of communication between the first base station device BS1 and the mobile station device MS2 is less than a predetermined threshold value T3 to the determination condition described above. When the first determination unit 40 determines that the transmission of user data from the second base station device BS2 to the mobile station device MS2 is allowed, the control information notification unit 26 transmits connection control information about the mobile station device MS2, which is stored in the control information storage unit 21, to the adjacent second base station device BS2.

When the first determination unit 40 determines that the transmission of user data from the second base station device BS2 to the mobile station device MS2 is allowed, the requesting unit 41 requests the second base station device BS2 to transmit the user data to the mobile station device MS2. The second base station device BS2 may be requested implicitly in the form of notification of connection control information by the control information notification unit 26. In this case, the requesting unit 41 and the control information notification unit 26 may be implemented as the same element.

Upon receipt of the request made by the requesting unit 41, the second base station device BS2 determines the possibility of transmission of user data from the second base station device BS2 to the mobile station device MS2, and sends a determination results to the first base station device BS1. When the transmission of user data from the second base station device BS2 to the mobile station device MS1 is performed, the connection control information received by the control information receiving unit 30 is stored in the control information storage unit 21. The subsequent process is similar to the process of the exemplary embodiment described above with reference to FIGS. 3 to 5 and FIGS. 6A and 6B.

FIG. 8 is a diagram describing a first example of a process performed by the first base station device BS1. In another embodiment, the operations in Operations BA to BH may be implemented as steps. The operations in Operations BA to BH are repeatedly performed on each mobile station device MS connected to the first base station device BS1.

In Operation BB, the mobile station specifying unit 25 and the first determination unit 40 execute a first determination process described below. FIG. 9 is a diagram describing the first determination process in Operation BB of FIG. 8. In another embodiment, the operations in Operations CA to CF may be implemented as steps.

In Operation CA, the mobile station specifying unit 25 determines whether or not the difference ΔQ between the quality of communication between the first base station device BS1 and the mobile station device MS and the quality of communication between the second base station device BS2 and the mobile station device MS is greater than or equal to a predetermined threshold value T1. When the difference ΔQ is greater than or equal to the predetermined threshold value T1 (YES in Operation CA), the process proceeds to Operation CB. When the difference ΔQ is less than the predetermined threshold value T1 (NO in Operation CA), the process proceeds to Operation CD.

In Operation CB, the mobile station specifying unit 25 adds the current mobile station device MS to a center-area-allocated group that is a group of mobile station devices located in the center area CC1. Then, the process proceeds to Operation CC. In Operation CD, the mobile station specifying unit 25 adds the current mobile station device MS to an edge-area-allocated group that is a group of mobile station devices located in the edge area E1. Then, the process proceeds to Operation CE.

In Operation CE, the first determination unit 40 determines whether or not the difference ΔQ is greater than or equal to a predetermined threshold value T2. The threshold value T2 may be a value less than or equal to the threshold value T1. When the difference ΔQ is greater than or equal to the predetermined threshold value T2 (YES in Operation CE), the process proceeds to Operation CC. When the difference ΔQ is less than the predetermined threshold value T2 (NO in Operation CE), the process proceeds to Operation CF.

In Operation CC, the first determination unit 40 determines that the current mobile station device MS is not a mobile station device to be multi-channel accessed to which user data is transmitted from the second base station device BS2 in addition to the first base station device BS1. Then, the process ends. In Operation CF, on the other hand, the first determination unit 40 determines that the current mobile station device MS is a mobile station device to be multi-channel accessed. Then, the process ends.

Reference is made to FIG. 8. In Operation BC, the requesting unit 41 determines whether or not a request for transmitting user data from the second base station device BS2 to the current mobile station device MS as a multi-channel access target has already been sent to the second base station device BS2. When the request has not yet been sent (NO in Operation BC), the process proceeds to Operation BD. When the request has already been sent (YES in Operation BC), the process proceeds to Operation BF.

In Operation BD, the requesting unit 41 determines whether or not it has been determined in Operation BB that the current mobile station device MS is a multi-channel access target. When the current mobile station device MS is not a multi-channel access target (NO in Operation BD), the process for the current mobile station device MS ends. When the current mobile station device MS is a multi-channel access target (YES in Operation BD), the process proceeds to Operation BE. In Operation BE, the requesting unit 41 requests the second base station device BS2 to add connection control information about the current mobile station device MS to the connection control information stored in the control information storage unit 21. That is, the requesting unit 41 requests the second base station device BS2 to transmit user data to the current mobile station device MS. Further, the control information notification unit 26 notifies the second base station device BS2 of the connection control information about the current mobile station device MS. Then, the process for the current mobile station device MS ends.

In Operation BF, the requesting unit 41 determines whether or not it has been determined in Operation BB that the current mobile station device MS is a multi-channel access target. When the current mobile station device MS is a multi-channel access target (YES in Operation BF), the process for the current mobile station device MS ends. When the current mobile station device MS is not a multi-channel access target (NO in Operation BF), the process proceeds to Operation BG.

In Operation BG, the requesting unit 41 executes an exclusion process described below. FIG. 10 is a diagram describing the exclusion process in Operation BG of FIG. 8. In another embodiment, the operations in Operations DA to DC may be implemented as steps. In Operation DA, the requesting unit 41 determines whether or not a predetermined period has elapsed since the current mobile station device MS was no longer a multi-channel access target. When the predetermined period has not yet elapsed (NO in Operation DA), the process proceeds to Operation DB. When the predetermined period has elapsed (YES in Operation DA), the process proceeds to Operation DC.

In Operation DB, the requesting unit 41 requests the second base station device BS2 to exclude the current mobile station device MS for which the connection control information is stored in the control information storage unit 21 of the second base station device BS2 from the target to which user data is transmitted and to which a radio resource is allocated. Then, the process ends.

On the other hand, in Operation DC, the requesting unit 41 requests the second base station device BS2 to delete the connection control information about the current mobile station device MS for which the connection control information is stored in the control information storage unit 21 of the second base station device BS2. Then, the process ends. Reference is made to FIG. 8. After Operation BG, the process for the current mobile station device MS ends.

According to the present exemplary embodiment, a mobile station device having relatively high quality of communication with the second base station device BS2 can be selected from among the mobile station devices MS located in the edge area E1 of the first base station device BS1 as a multi-channel access target to which user data is transmitted from the second base station device BS2. Thus, when data is transmitted from the second base station device BS2 other than the first base station device BS1, the risk of reduction in the quality of communication between the second base station device BS2 and the mobile station device MS can be reduced.

Figure 11:
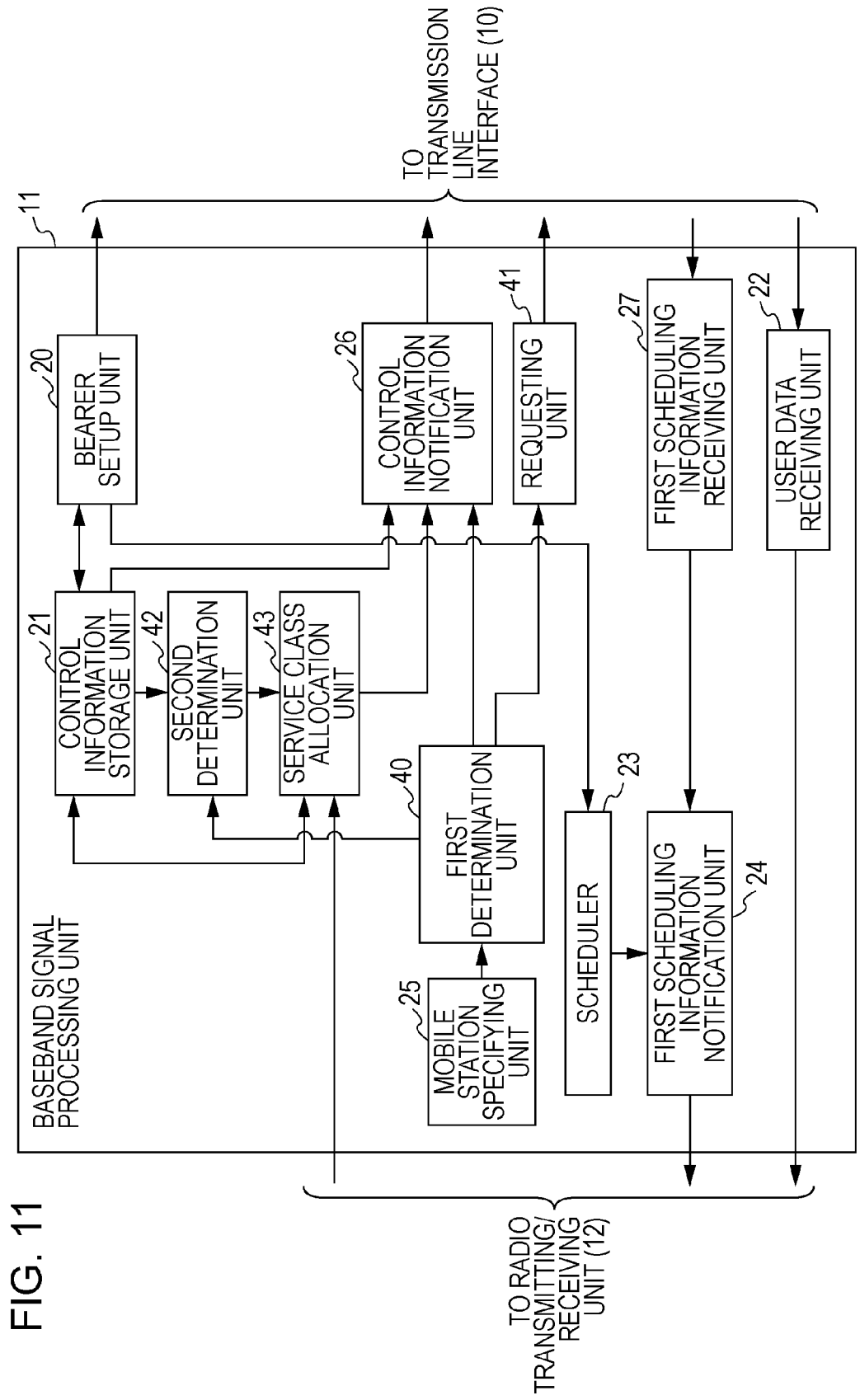
FIG. 11 is a diagram describing a third example configuration of the base band signal processing unit in the first base station device.

Subsequently, another process performed by the base band signal processing unit 11 when a base station device BS operates as the first base station device BS1 will be described. FIG. 11 is a diagram describing a third example configuration of the base band signal processing unit 11 in the first base station device BS1. Reference numeral 42 denotes a second determination unit, and reference numeral 43 denotes a service class allocation unit. Elements similar to the elements illustrated in FIG. 7 are assigned the same reference numerals as the reference numerals used in FIG. 7. The base band signal processing unit 11 includes the second determination unit 42 and the service class allocation unit 43.

The second determination unit 42 determines whether or not user data in the downlink to be transmitted to a mobile station device MS2 that is determined to be a multi-channel access target includes data belonging to a plurality of service classes. For convenience of description, a mobile station device MS to which user data including data belonging to a plurality of service classes is transmitted is represented by the mobile station device MS3.

The service class allocation unit 43 allocates a service class that is transmitted to the mobile station device MS3 between the first base station device BS1 and the second base station device BS2. In this case, the service class allocation unit 43 allocates, as the service class of the user data transmitted from the second base station device BS2, a service class different from the service class of the user data transmitted from the first base station device BS1.

The service class allocation unit 43 may determine the allocation of a service class to each of the base station devices BS1 and BS2 in accordance with the quality of communication between the first base station device BS1 and the mobile station device MS3 and the quality of communication between the second base station device BS2 and the mobile station device MS3. For example, the service class allocation unit 43 may allocate a service class having a higher transmission rate or priority to a base station device BS having a higher quality of communication.

The service class allocation unit 43 may also determine whether or not the difference $\Delta Q$ between the quality of communication between the first base station device BS1 and the mobile station device MS3 and the quality of communication between the second base station device BS2 and the mobile station device MS3 is smaller than a predetermined threshold value T4. When the difference $\Delta Q$ is smaller than the threshold value T4, the priority of a service class to be allocated to the second base station device BS2 may be set to a value greater than or equal to a predetermined value.

The service class allocation unit 43 requests the second base station device BS2 to receive data of the service class allocated to the second base station device BS2 in the manner described above from the core network CN and to transmit the received data to the mobile station device MS3.

In order to notify the second base station device BS2 of the request described above and the allocated service class, for example, the control information notification unit 26 may perform the following process: For example, the control information notification unit 26 may transmit information which specifies a radio bearer having the service class allocated to the second base station device BS2 to the second base station device BS2 as connection control information. Further, for example, the control information notification unit 26 may transmit information indicating the service class allocated to the second base station device BS2 to the second base station device BS2. Further, for example, the control information notification unit 26 may transmit a standard that is used by the bearer setup unit 20 of the second base station device BS2 to specify the service class allocated to the second base station device BS2 to the second base station device BS2.

In accordance with the above information notified by the control information notification unit 26, the bearer setup unit 20 of the second base station device BS2 specifies a radio bearer of the mobile station device MS3 having the allocated service class, and sets up a radio bearer similar to the specified radio bearer. Through this process, the user data receiving unit 22 receives user data having the allocated service class from the core network CN.

Figure 12:
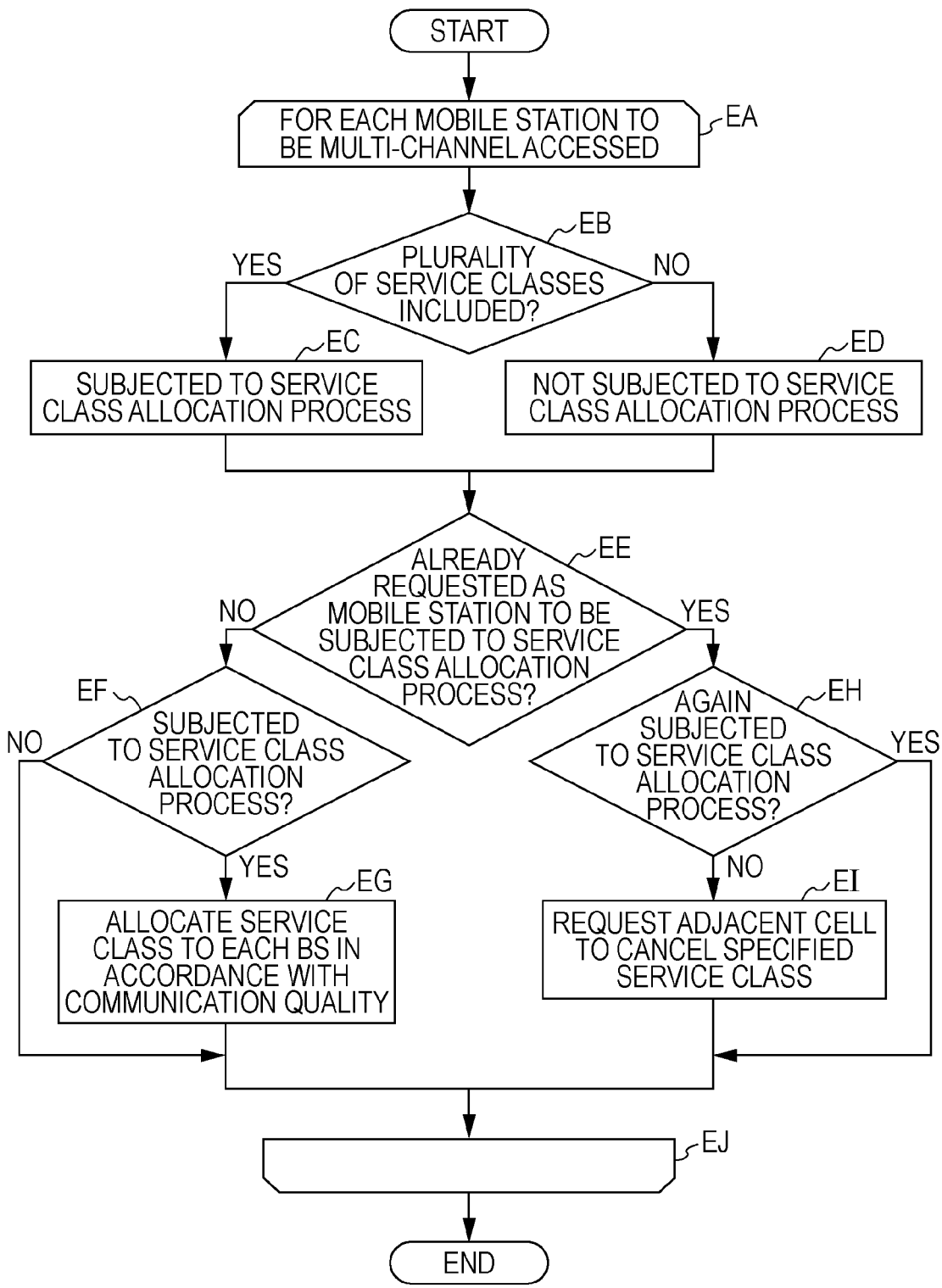
FIG. 12 is a diagram describing a second example of a process performed by the first base station device.

FIG. 12 is a diagram describing a second example of a process performed by the first base station device BS1. In another embodiment, the operations in Operations EA to EJ may be implemented as steps. The operations in Operations EA to EJ are repeatedly performed on each mobile station device MS that is determined to be a multi-channel access target.

In Operation EB, the second determination unit 42 determines whether or not user data in the downlink to be transmitted to the current mobile station device MS includes data belonging to a plurality of service classes. When data belonging to a plurality of service classes is included (YES in Operation EB), the process proceeds to Operation EC. When data belonging to a plurality of service classes is not included (NO in Operation EB), the process proceeds to Operation ED.

In Operation EC, the second determination unit 42 determines that the current mobile station device MS is subjected to a service class allocation process for allocating the service class of data to be transmitted to the mobile station device MS between the first base station device BS1 and the second base station device BS2. Then, the process proceeds to Operation EE. In Operation ED, the second determination unit 42 determines that the current mobile station device MS is not subjected to the service class allocation process. Then, the process proceeds to Operation EE.

In Operation EE, the service class allocation unit 43 determines for the current mobile station device MS whether or not a request for specifying the service class of the data to be transmitted to the current mobile station device MS, as described above, has already been sent to the second base station device BS2. When the request has not yet been sent (NO in Operation EE), the process proceeds to Operation EF. When the request has already been sent (YES in Operation EE), the process proceeds to Operation EH.

In Operation EF, the service class allocation unit 43 determines whether or not the second determination unit 42 has determined that the current mobile station device MS is subjected to the service class allocation process. When the current mobile station device MS is not subjected to the service class allocation process (NO in Operation EF), the process for the current mobile station device MS ends. When the current mobile station device MS is subjected to the service class allocation process (YES in Operation EF), the process proceeds to Operation EG.

In Operation EG, the service class allocation unit 43 allocates a service class to be transmitted to the current mobile station device MS between the first base station device BS1 and the second base station device BS2. The service class allocation unit 43 requests the second base station device BS2 to specify the service class allocated to the second base station device BS2 in Operation EG as a service class of data to be transmitted to the current mobile station device MS. Then, the process for the current mobile station device MS ends.

In Operation EH, the service class allocation unit 43 determines whether or not the second determination unit 42 has determined that the current mobile station device MS is subjected to the service class allocation process. When the current mobile station device MS is subjected to the service class allocation process (YES in Operation EH), the process for the current mobile station device MS ends. When the current mobile station device MS is not subjected to the service class allocation process (NO in Operation EH), the process proceeds to Operation EI.

In Operation EI, the service class allocation unit 43 requests the second base station device BS2 to cancel the service class previously specified for the current mobile station device MS. Then, the process for the current mobile station device MS ends.

According to the present exemplary embodiment, when user data to be transmitted to the same mobile station device MS includes data belonging to a plurality of different service classes, the data of the plurality of different service classes can be transmitted from different base station devices BS to the same mobile station device MS. Thus, for example, data of a service class corresponding to the quality of communication between each base station device BS and a mobile station device MS can be individually transmitted from each base station device BS to the mobile station device MS. Consequently, the throughput can further be increased.

Figure 13:
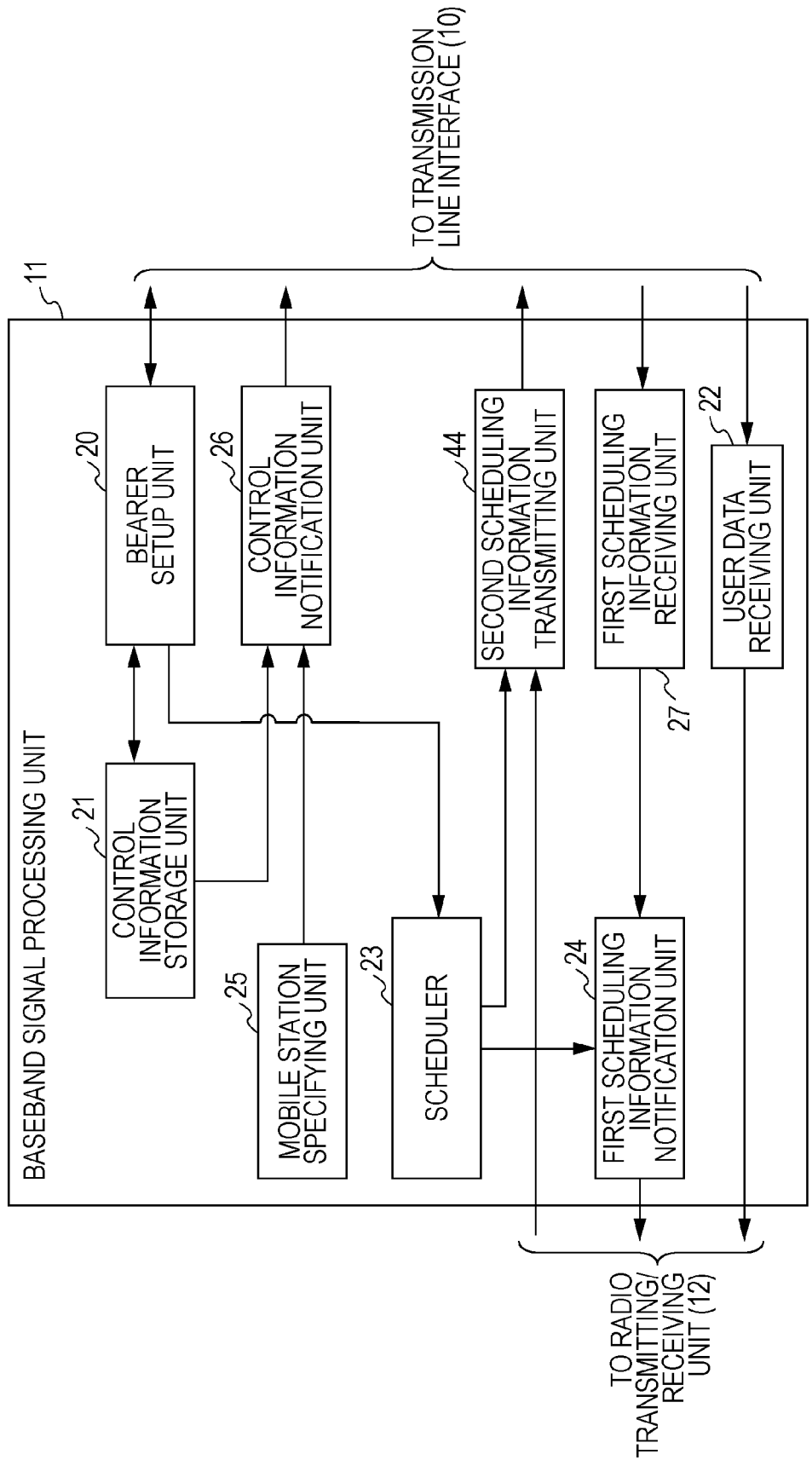
FIG. 13 is a diagram describing a fourth example configuration of the base band signal processing unit in the first base station device.

Subsequently, another process performed by the base band signal processing unit 11 when a base station device BS operates as the first base station device BS1 will be described. FIG. 13 is a diagram describing a fourth example configuration of the base band signal processing unit 11 in the first base station device BS1. Reference numeral 44 denotes a second scheduling information transmitting unit. Elements similar to the elements illustrated in FIG. 3 are assigned the same reference numerals as the reference numerals used in FIG. 3. The present exemplary embodiment may be used in combination with any of the other exemplary embodiments described above.

The base band signal processing unit 11 includes the second scheduling information transmitting unit 44. The second scheduling information transmitting unit 44 transmits scheduling information, which specifies a radio resource for transmitting user data from the first base station device BS1 to the mobile station device MS1, to the second base station device BS2.

Figure 14:
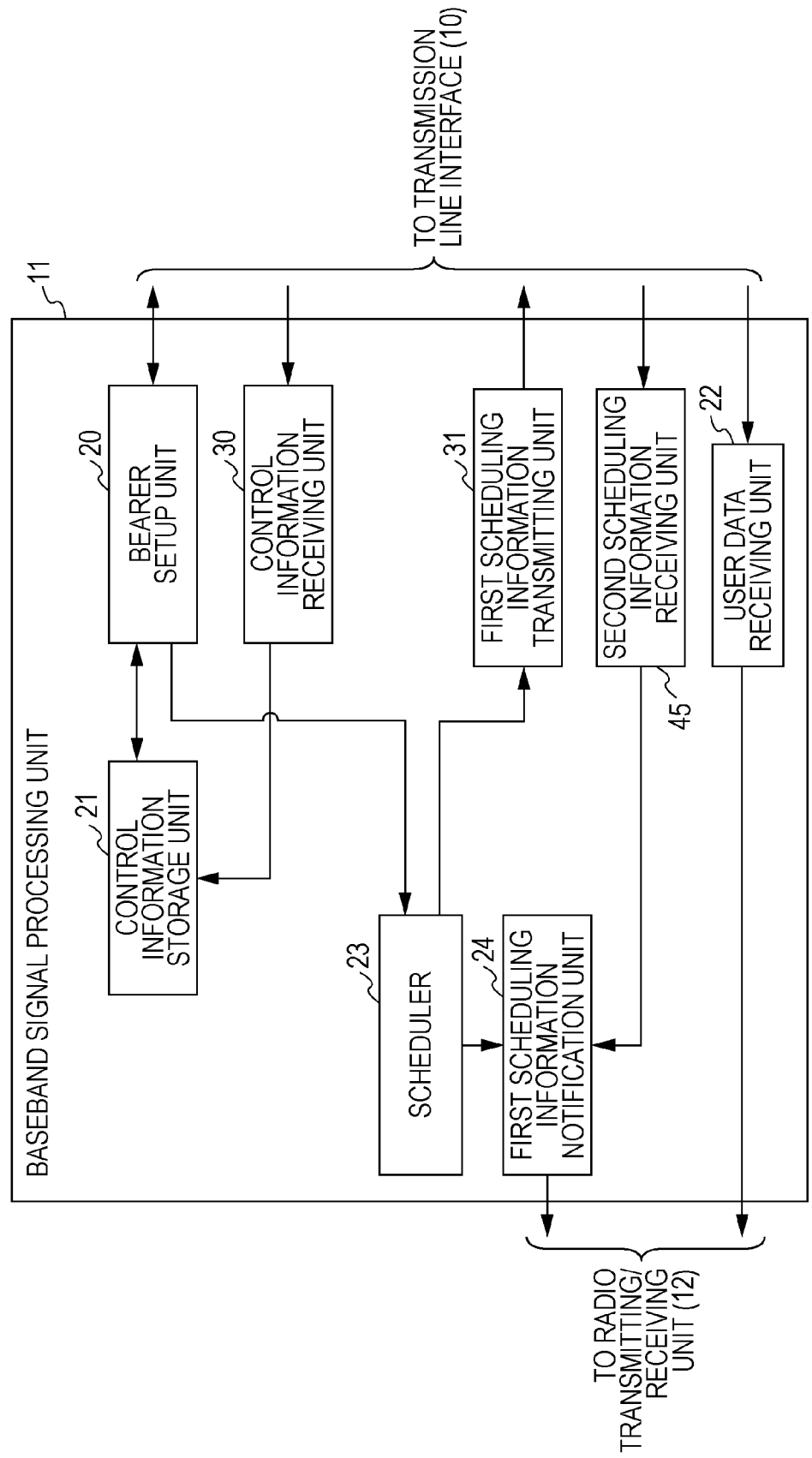
FIG. 14 is a diagram describing a second example configuration of the base band signal processing unit in the second base station device.

Subsequently, another process performed by the base band signal processing unit 11 when a base station device BS operates as the second base station device BS2 will be described. FIG. 14 is a diagram describing a second example configuration of the base band signal processing unit 11 in the second base station device BS2. Reference numeral 45 denotes a second scheduling information receiving unit. Elements similar to the elements illustrated in FIG. 4 are assigned the same reference numerals as the reference numerals used in FIG. 4. The present exemplary embodiment may be used in combination with any of the other exemplary embodiments described above.

The base band signal processing unit 11 includes the second scheduling information receiving unit 45. The second scheduling information receiving unit 45 receives scheduling information transmitted from the second scheduling information transmitting unit 44 of the first base station device BS1. The first scheduling information notification unit 24 of the second base station device BS2 transmits scheduling information about radio resources individually allocated to the mobile station device MS1 by the first base station device BS1 and the second base station device BS2 to the mobile station device MS1.

For example, the second scheduling information transmitting unit 44 of the first base station device BS1 may compare the quality of communication Q1 between the first base station device BS1 and the mobile station device MS1 with the quality of communication Q2 between the second base station device BS2 and the mobile station device MS1. When the quality of communication Q1 is lower than the quality of communication Q2, the second scheduling information transmitting unit 44 of the first base station device BS1 may transmit the scheduling information to the second base station device BS2. In this case, the first scheduling information notification unit 24 of the first base station device BS1 may not necessarily transmit the scheduling information about the radio resource allocated for the transmission of data from the first base station device BS1 to the mobile station device MS1. When scheduling information is received from the second scheduling information transmitting unit 44, the first scheduling information notification unit 24 of the second base station device BS2 may transmit the scheduling information about the radio resources allocated to the mobile station device MS1 by the base station devices BS1 and BS2 to the mobile station device MS1.

Further, for example, the second scheduling information transmitting unit 44 of the first base station device BS1 may transmit the scheduling information to the second base station device BS2 regardless of the quality of communication Q1 and the quality of communication Q2. In this case, when the quality of communication Q1 is lower than the quality of communication Q2, the first scheduling information notification unit 24 of the first base station device BS1 may not necessarily transmit the scheduling information about the radio resource allocated for the transmission of data from the first base station device BS1 to the mobile station device MS1.

When the quality of communication Q1 is lower than the quality of communication Q2, the first scheduling information notification unit 24 of the second base station device BS2 may transmit the scheduling information about the radio resources allocated to the mobile station device MS1 by the first base station device BS1 and the second base station device BS2 to the mobile station device MS1.

Figure 15:
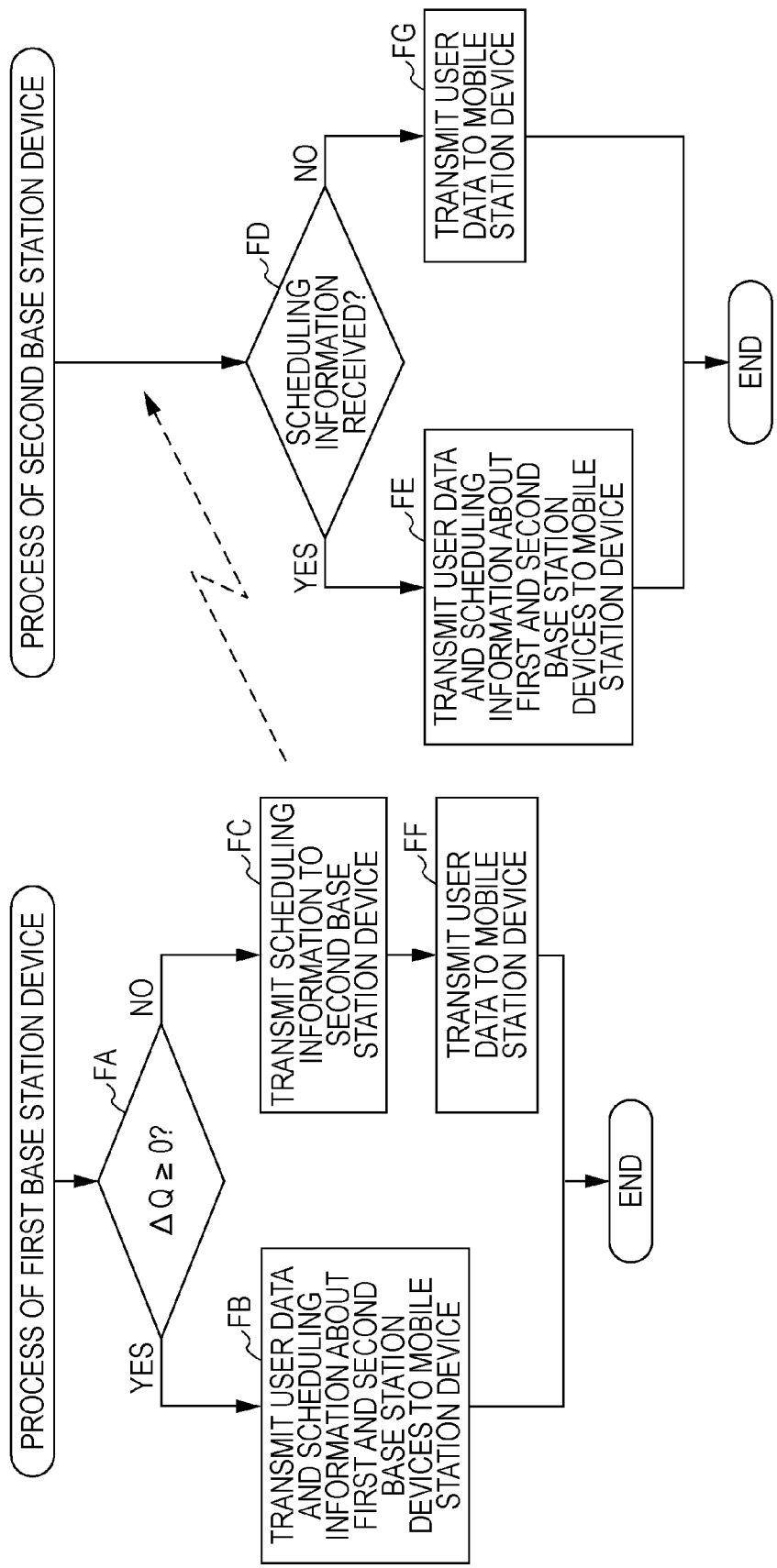
FIG. 15 is a diagram describing a second example of a process performed by the first base station device and the second base station device.

An example of the process performed by the first base station device BS1 and the second base station device BS2 described with reference to FIGS. 13 and 14, respectively, will be described. FIG. 15 is a diagram describing a second example of the process performed by the first base station device BS1 and the second base station device BS2. In another embodiment, the operations in Operations FA to FG may be implemented as steps.

In Operation FA, the second scheduling information transmitting unit 44 of the first base station device BS1 compares the quality of communication Q1 between the first base station device BS1 and the mobile station device MS1 with the quality of communication Q2 between the second base station device BS2 and the mobile station device MS1. When the difference $\Delta Q$ between the quality of communication Q1 and the quality of communication Q2, i.e., $\Delta Q = Q1 - Q2$, is greater than or equal to "0" (YES in Operation FA), the process proceeds to Operation FB. When the difference $\Delta Q$ is smaller than "0" (NO in Operation FA), the process proceeds to Operation FC.

In Operation FB, the first scheduling information notification unit 24 of the first base station device BS1 transmits the scheduling information about the radio resources individually allocated to the mobile station device MS1 by the base station devices BS1 and BS2. Further, the first base station device BS1 transmits user data to the mobile station device MS1 using the radio resource allocated by the scheduler 23 of the first base station device BS1. Then, the process performed by the first base station device BS1 ends.

In Operation FC, the second scheduling information transmitting unit 44 of the first base station device BS1 transmits the scheduling information to the second base station device BS2. Then, the process proceeds to Operation FF.

In Operation FD, the first scheduling information notification unit 24 of the second base station device BS2 determines whether or not the second scheduling information receiving unit 45 has received the scheduling information. When the scheduling information has been received (YES in Operation FD), the process proceeds to Operation FE. When the scheduling information has not been received (NO in Operation FD), the process proceeds to Operation FG.

In Operation FE, the first scheduling information notification unit 24 of the second base station device BS2 transmits the scheduling information about the radio resources allocated to the mobile station device MS1 by the first base station device BS1 and the second base station device BS2. Further, the second base station device BS2 transmits user data to the mobile station device MS1 using the radio resource allocated by the scheduler 23 of the second base station device BS2. Then, the process performed by the second base station device BS2 ends. On the other hand, in Operation FF, the first base station device BS1 transmits user data to the mobile station device MS1 using the radio resource allocated by the scheduler 23 of the first base station device BS1. Then, the process performed by the first base station device BS1 ends.

In Operation FG, the second base station device BS2 transmits user data to the mobile station device MS1 using the radio resource allocated by the scheduler 23 of the second base station device BS2. Then, the process performed by the second base station device BS2 ends.

According to the present exemplary embodiment, the transmission source of the scheduling information can be changed so that the scheduling information can be transmitted from a base station device BS having a high quality of communication among adjacent base station devices BS. Thus, the probability that the mobile station devices MS succeed to receive the scheduling information can be increased, and the efficiency of communication between the mobile station devices MS and the base station devices BS can also be increased.

Figure 16:
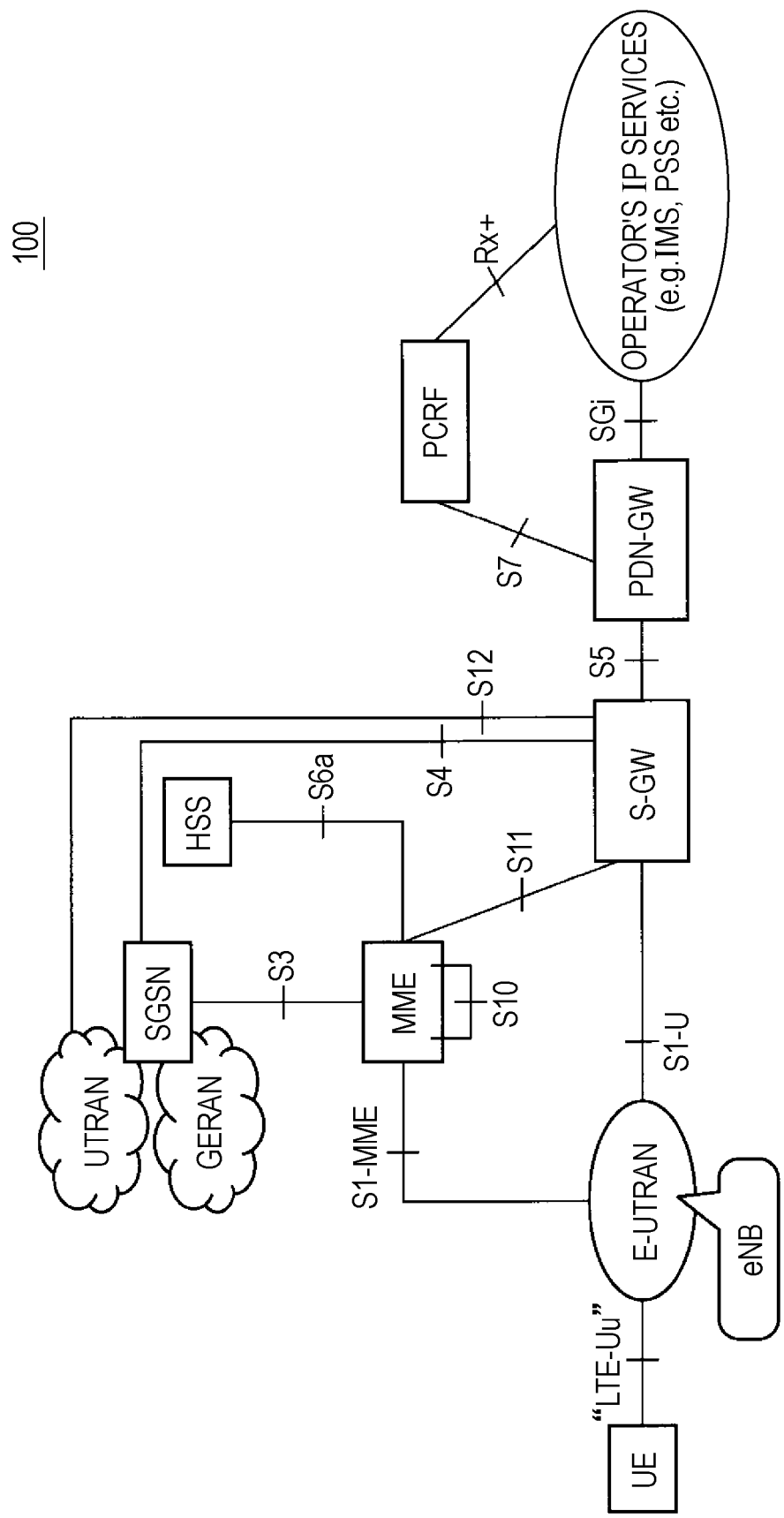
FIG. 16 is a configuration diagram of a radio communication system according to a second exemplary embodiment.

Subsequently, an exemplary embodiment in which the radio communication system according to each of the exemplary embodiments described above is applied to the Long Term Evolution (LTE) communication scheme, which is examined in the 3rd Generation Partnership Project (3GPP), will be described. FIG. 16 is a configuration diagram of a Systems Architecture Evolution (SAE) architecture, which is a radio communication system according to a second exemplary embodiment. FIG. 16 corresponds to FIG. 4.2.1-1 in 3GPP TS23.401 V9.1.0.

A radio communication system 100 includes, for example, an Evolved Universal Terrestrial Radio Access Network (E-UTRAN), a Serving General Packet Radio Service (GPRS) Support Node (SGSN), a Home Subscriber Server (HSS), a Mobility Management Entity (MME), a Serving Gateway (S-GW), a Packet Data Network Gateway (PDN-GW), the Policy and Charging Rules Function (PCRF), and the Call Session Control Function (CSCF). The E-UTRAN includes user terminals (user entities (UEs)) serving as mobile station devices MS, and eNodeBs (eNBs for short) serving as base station devices BS.

Each UE is provided with a radio interface, and is connected to an eNB within the service area of the eNB via a radio link so as to communicate with another UE, a server device, or the like through the eNB. The radio link includes an uplink (UL) from the UE to the eNB, and a downlink (DL) from the eNB to the UE. Examples of UEs include mobile phones, personal digital assistants (PDAs), and notebook personal computers (PCs). The UEs may also be communication terminals connected to eNBs via wired interfaces.

Each eNB is an entity (node) that terminates a radio interface between the eNB and a UE, and receives radio packets from the UE or transmits radio packets to the UE. The HSS is a server having a database that centrally manages user information such as user names or UE location information. The MME (management device) is an entity (logical node) that manages the positions (mobility) of UEs and performs the management of bearers, Non-Access-Stratum (NAS) signaling, and the like in cooperation with the HSS.

The SGSN is a node provided so as to be connected to a radio access network (more specifically, radio network controllers (RNCs) as constituent elements thereof) such as UTRAN or Enhanced Data Rates for Global System for Mobile Communication (GSM) Radio Access Network (GERAN) in the General Packet Radio Service (GPRS) environment. The SGSN locates the position of UEs in cooperation with the MME, and provides the security function and access control for the UEs.

The S-GW (packet communication device) is an entity serving to interface with the E-UTRAN and the SGSN, and transmits and receives user packets to and from E-UTRAN eNBs and to and from UTRAN or GERAN RNCs via the SGSN. The PDN-GW is a gateway node that terminates an interface between the PDN-GW and a Packet Data Network (PDN). Examples of the PDN include the Internet, an intra-operator network, a private packet data network, and a packet data network between operators (such as a network for providing Internet Protocol (IP) Multimedia Subsystem (IMS) services or Packet-switched Streaming Services (PSSs)). The PDN-GW may also be consolidated with the S-GW and a single node may be provided.

The PCRF is an entity (logical node) that manages and controls various policies such as bearer Quality of Service (QoS) policies and charging rules in accordance with requests from an entity (logical node) that manages and controls sessions (bearers) in the IMS, called Call Session Control Function (CSCF). The CSCF is implemented as, for example, a function of an application server such as an IMS server serving as a constituent element of the PDN.

In FIG. 16, "LTE-Uu", "S1-U", "S1-MME", "S3", "S4", "S5", "S6a", "S7", "S11", "S12", "SGi", "Rx+", and the like represent the names of interfaces between nodes (entities) ("S10" represents the name of an interface within the MME).

"LTE-Uu" represents the name of the interface between the UE and the eNB, "S1-U" represents the name of the interface between the eNB and the S-GW, "S1-MME" represents the name of the interface between the eNB and the MME, "S3" represents the name of the interface between the MME and the SGSN, and "S4" represents the name of the interface between the SGSN and the S-GW.

"S5" represents the name of the interface between the S-GW and the PDN-GW, "S6a" represents the name of the interface between the MME and the HSS, "S7" represents the name of the interface between the PDN-GW and the PCRF, "S11" represents the name of the interface between the MME and the S-GW, "S12" represents the name of the interface between the S-GW and a constituent element of the UTRAN, "SGi" represents the name of the interface between the PDN-GW and the PDN (CSCF), and "Rx+" represents the name of the interface between the PDN (CSCF) and the PCRF.

Figure 17:
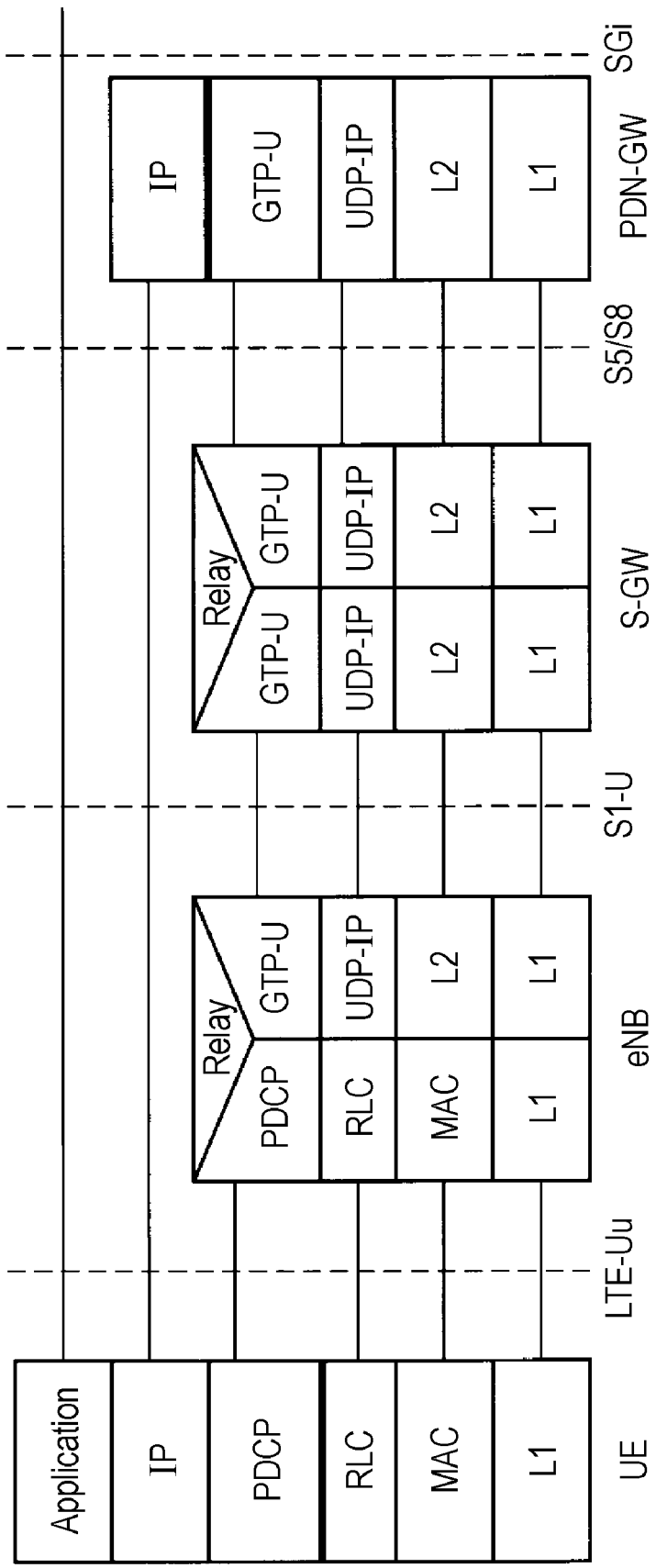
FIG. 17 is a diagram describing the protocol structure of the user plane in the radio communication system illustrated in FIG. 16.

FIG. 17 is a diagram describing the protocol structure of the user plane in the SAE architecture as the radio communication system 100 illustrated in FIG. 16. FIG. 17 corresponds to FIG. 5.1.2.1-1 in 3GPP TS23.401 V9.1.0.

The protocol between the user terminal UE and the base station device eNB includes the L1 layer (physical layer), the Medium Access Control (MAC) layer, the Radio Link Control (RLC) layer, and the Packet Data Convergence Protocol (PDCP) layer. Further, the protocol between the user terminal UE and the PDN-GW includes the Internet Protocol (IP) layer, and the protocol between the user terminal UE and the host device as the communication counterpart includes the Application layer.

The protocol between the base station device eNB and the S-GW includes the L1 layer, the L2 layer (data link layer), the User Datagram Protocol/Internet Protocol (UDP/IP) layer, and the GPRS Tunneling Protocol for the User Plane (GTP-U) layer. The same applies to the protocol between the S-GW and the PDN-GW.

Figure 18:
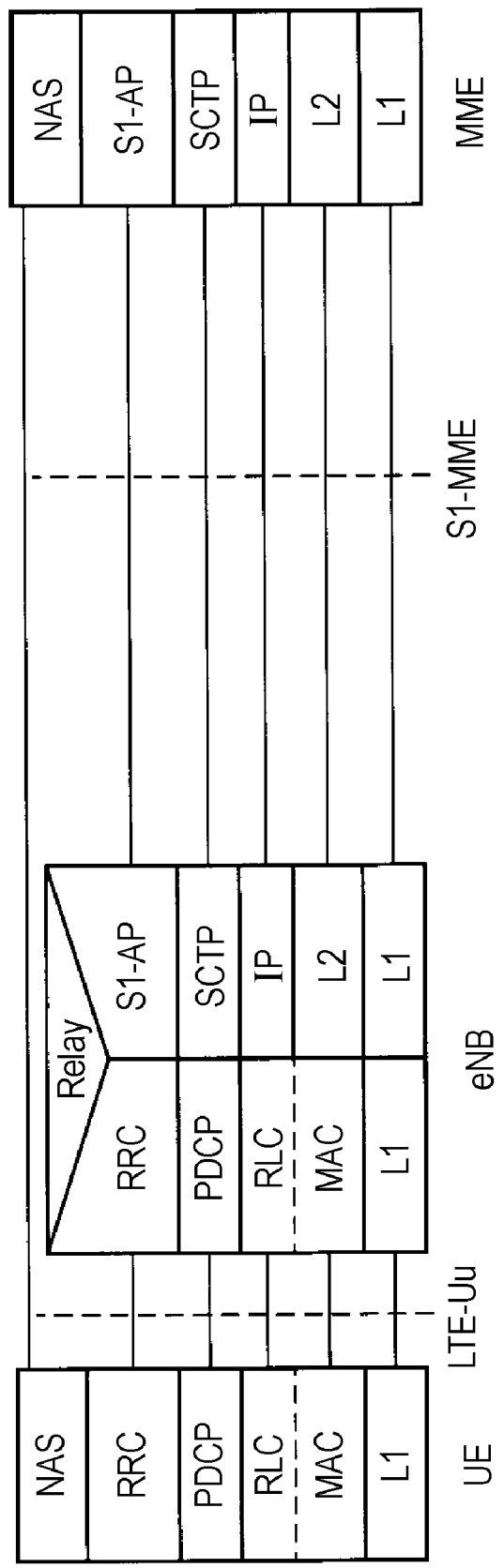
FIG. 18 is a diagram describing the protocol structure of the control plane in the radio communication system illustrated in FIG. 16.

FIG. 18 is a diagram describing the protocol structure of the control plane in the SAE architecture as the radio communication system 100 illustrated in FIG. 16. FIG. 18 corresponds to is FIG. 5.1.1.3-1 in 3GPP TS23.401 V9.1.0.

The protocol between the user terminal UE and the base station device eNB includes the L1 layer, the MAC layer, the RLC layer, the PDCP layer, and the Radio Resource Control (RRC) layer. Further, the protocol between the user terminal UE and the MME includes the Non-Access Stratum (NAS) layer. The protocol between the base station device eNB and the MME includes the L1 layer, the L2 layer, the Internet Protocol (IP) layer, the Stream Control Transmission Protocol (SCTP) layer, and the S1 Application Protocol (S1-AP).

Figure 19:
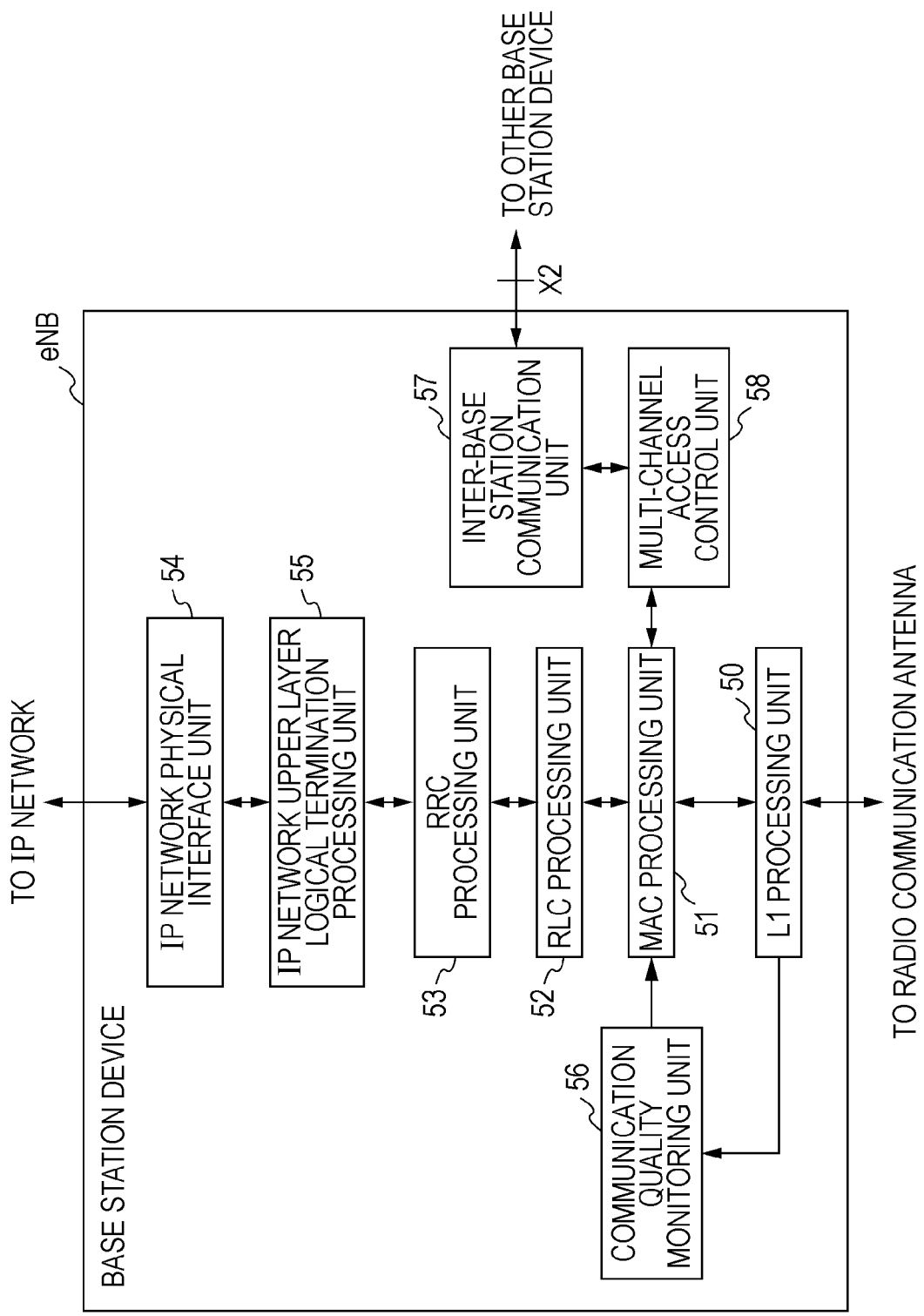
FIG. 19 is a diagram describing an example configuration of a base station device illustrated in FIG. 16.

FIG. 19 is a diagram describing an example configuration of the base station device eNB illustrated in FIG. 16. Reference numeral 50 denotes an L1 processing unit, reference numeral 51 denotes a MAC processing unit, reference numeral 52 denotes an RLC processing unit, reference numeral 53 denotes an RRC processing unit, and reference numeral 54 denotes an IP network physical interface unit. Reference numeral 55 denotes an IP network upper layer logical termination processing unit, reference numeral 56 denotes a communication quality monitoring unit, reference numeral 57 denotes an inter-base station communication unit, and reference numeral 58 denotes a multi-channel access control unit.

The base station device eNB includes the L1 processing unit 50, the MAC processing unit 51, the RLC processing unit 52, the RRC processing unit 53, the IP network physical interface unit 54, the IP network upper layer logical termination processing unit 55, and the communication quality monitoring unit 56. The base station device eNB further includes the inter-base station communication unit 57 and the multi-channel access control unit 58.

The L1 processing unit 50, the MAC processing unit 51, the RLC processing unit 52, and the RRC processing unit 53 perform the processes concerning the L1 layer, the MAC layer, the RLC layer, and the RRC layer between the user terminal UE and the base station device eNB, respectively.

The IP network physical interface unit 54 performs the process concerning the L1 layer of the communication performed via an IP network between the MME, the S-GW, and the PDN-GW, which are upper-level devices, and the base station device eNB. The IP network upper layer logical termination processing unit 55 terminates the protocol higher than the L1 layer between the MME, S-GW, the PDN-GW, and the base station device eNB, and performs an interface process between a wired network and a wireless network.

The communication quality monitoring unit 56 monitors the quality of communication between the base station device eNB and the user terminal UE. For example, the communication quality monitoring unit 56 measures the quality of communication in the uplink in accordance with a radio wave or radio signal received from the user terminal UE. Further, the communication quality monitoring unit 56 receives information about the quality of communication in the downlink measured by the user terminal UE.

The inter-base station communication unit 57 performs a communication process via an X2 interface between another base station device including an adjacent base station device and the base station device eNB. "X2" represents the name of the interface between base station devices in the E-UTRAN. The multi-channel access control unit 58 executes a process for transmitting data from a plurality of base station devices to the user terminal UE located in the edge area.

For example, the process performed by the bearer setup unit 20 in the exemplary embodiments described above may be executed by the RRC processing unit 53. Further, the process performed by the user data receiving unit 22 may be executed by the IP network physical interface unit 54 and the IP network upper layer logical termination processing unit 55.

Further, for example, the process performed by the scheduler 23 and the mobile station specifying unit 25 may be executed by the MAC processing unit 51. For example, the process of the first scheduling information notification unit 24 may be executed by the MAC processing unit 51 and the multi-channel access control unit 58. Further, the process performed by the control information notification unit 26, the first scheduling information receiving unit 27, the control information receiving unit 30, and the first scheduling information transmitting unit 31 may be executed by the inter-base station communication unit 57 and the multi-channel access control unit 58. Further, the process performed by the bearer specifying information transmitting unit and the bearer specifying information receiving unit described with reference to FIGS. 3 and 4 may be executed by the inter-base station communication unit 57 and the multi-channel access control unit 58.

For example, the process performed by the first determination unit 40, the second determination unit 42, and the service class allocation unit 43 may be executed by the multi-channel access control unit 58. The process performed by the requesting unit 41, the second scheduling information transmitting unit 44, and the second scheduling information receiving unit 45 may be executed by the inter-base station communication unit 57 and the multi-channel access control unit 58.

Figure 20:
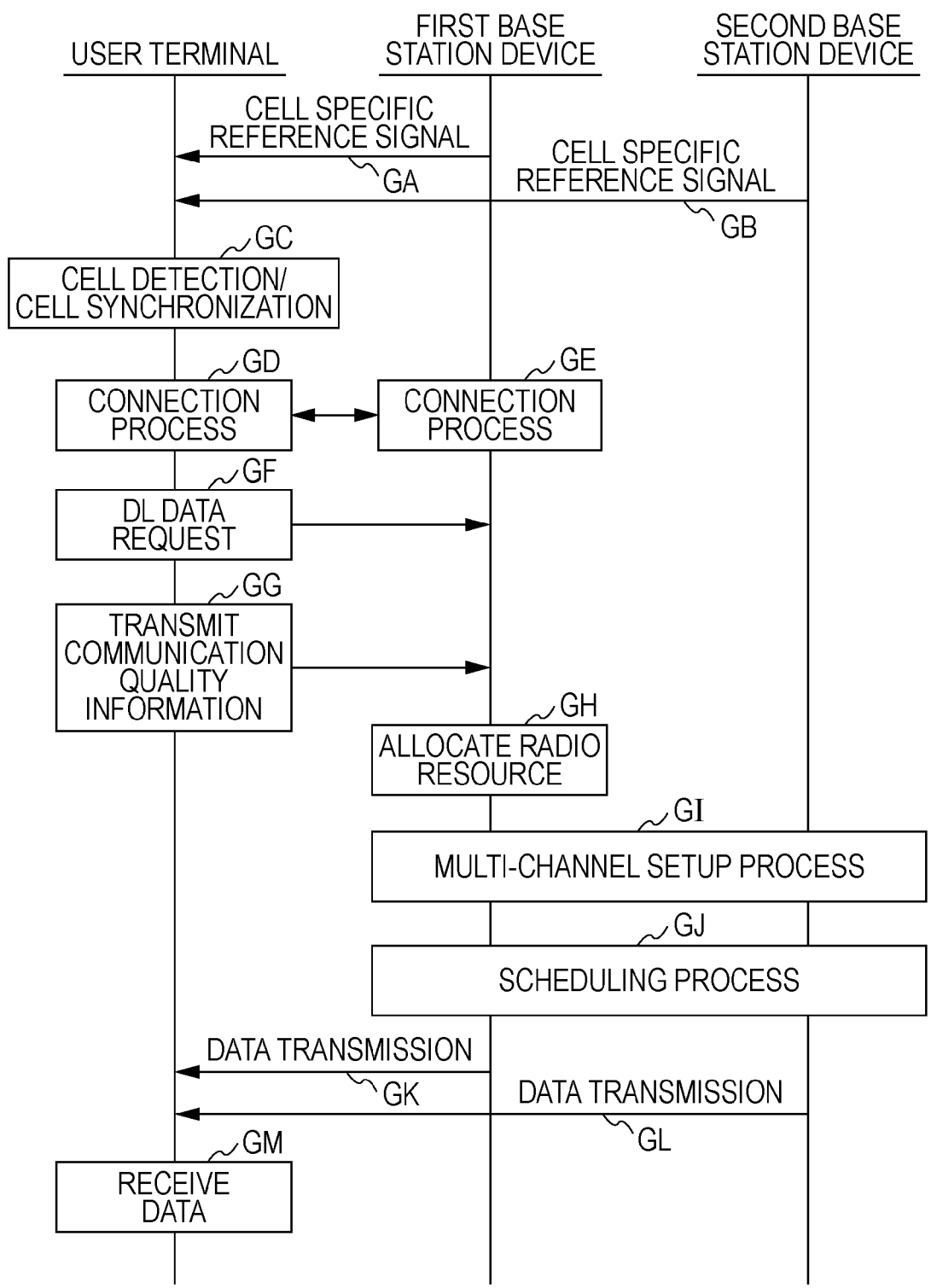
FIG. 20 is a diagram describing an example of a process performed by the radio communication system illustrated in FIG. 16.

FIG. 20 is a diagram describing an example of a process performed by the radio communication system 100 illustrated in FIG. 16. In another embodiment, the operations in Operations GA to GM may be implemented as steps. In the following description, it is assumed that a user terminal UE exists in an area where the edge areas of two adjacent base station devices, namely, a first base station device eNB1 and a second base station device eNB2, overlap.

In Operations GA and GB, the user terminal UE receives a cell specific reference signal transmitted from the first base station device eNB1 and a cell specific reference signal transmitted from the second base station device eNB2. In Operation GC, the user terminal UE executes a cell detection process and a cell synchronization process in accordance with the intensity of the reception correlation power of the received cell specific reference signals. In the present example, the user terminal UE identifies the first base station device eNB1 as a base station device that covers the cell where the user terminal UE is located, that is, a base station device to which the user terminal UE is connected.

In Operations GD and GE, the user terminal UE and the first base station device eNB1 perform a connection process between the user terminal UE and the first base station device eNB1 in accordance with a random access control flow. After the completion of the connection process, in Operations GF and GG, the user terminal UE transmits a transmission request of downlink data and communication quality information indicating the quality of communication in the downlink measured by the user terminal UE to the first base station device eNB1.

In Operation GH, the L1 processing unit 50 and MAC processing unit 51 of the first base station device eNB1 perform a radio resource allocation process on each user terminal using FFR in accordance with the communication quality information received from the user terminal UE or other user terminals. In Operation GI, the first base station device eNB1 and the second base station device eNB2 execute a multi-channel setup process for setting up a channel for transmitting data from the second base station device eNB2 to the user terminal UE. The process performed in Operation GI may be, for example, the process in Operations AA to AC described with reference to FIG. 5 and the process described with reference to FIGS. 8 to 10 and 12.

In Operation GJ, the first base station device eNB1 and the second base station device eNB2 perform a process concerning the scheduling of the radio resource for transmitting data from the second base station device eNB2 to the user terminal UE. The process performed in Operation GJ may be, for example, the process in Operation AD to AF described with reference to FIG. 5. In Operation GJ, the first base station device eNB1 notifies the user terminal UE of scheduling information about the radio resources allocated by the first base station device eNB1 and the second base station device eNB2.

In Operations GK and GL, the first base station device eNB1 and the second base station device eNB2 transmit user data to the user terminal UE using the radio resources which the user terminal UE has been notified of in advance in Operation GJ. In Operation GM, the user terminal UE that demodulates and decodes the scheduling information notified in Operation GJ receives the user data transmitted from the first base station device eNB1 and the second base station device eNB2. Subsequently, the operations in Operations GF to GM are repeatedly executed at intervals synchronized with radio access frames or access slots.

According to the present exemplary embodiment, in a radio communication system in which the LTE and the FFR are applied, the throughput for transmitting data to a user terminal located in an edge area whose frequency reuse factor is not "1" can be increased.

Exemplary embodiments in which the radio communication systems according to exemplary embodiments illustrated in FIGS. 1 to 15 are applied to the LTE have been described by way of example. Similarly, the radio communication systems according to exemplary embodiments illustrated in FIGS. 1 to 15 may be applied to a Worldwide Interoperability for Microwave Access (WiMAX) communication system specified in the Institute of Electrical and Electronics Engineers, Inc. (IEEE) 802.16e. In this case, the core network CN described above may be implemented by a connectivity service network. Further, the radio access network RN described above may be implemented by an access service network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio communication system for communicating with a mobile station comprising:
    a first base station which communicates with the mobile station in a first area; and
    a second base station which communicates with the mobile station in a second area, a part of the second area being same with the first area;
    the first base station comprising:
        a first receiving unit configured to receive connection control information from the second base station, the connection control information including information indicating data to be sent from the second base station to the mobile station;
        a first setup unit configured to receive scheduling information for deciding whether the data sent to the mobile station is sent from the first base station or not, based on the received connection control information and a communication resource that can be used to send data from the first base station to the mobile station; and
        a first transmitting unit configured to transmit the generated scheduling information to the second base station and for transmitting the data decided to send to the mobile station on the basis of the scheduling information;
    the second base station comprising:
        a second transmitting unit configured to transmit the connection control information to the first base station and for transmitting the data decided to send to the mobile station on the basis of the scheduling information; and
        a second receiving unit configured to receive the scheduling information from the first base station.

2. The radio communication system of claim 1, wherein the second receiving unit sends the scheduling information to the mobile station.

3. The radio communication system of claim 1, the first base station further comprising:
    a determination unit configured to compare a first communication quality information with a second communication quality information, the first communication quality information indicating quality of communication between the first base station and the mobile station, the second communication quality information indicating quality of communication between the second base station and the mobile station; and
    a requesting unit configured to request to transmit the data from the second base station to the mobile station on based on the result of the comparison by the determination unit.

4. The radio communication system of claim 1, the first base station further comprising:
    a determination unit configured to determine contents of the data in accordance with comparison a first communication quality information with a second communication quality information, the first communication quality information indicating quality of communication between the first base station and the mobile station, the second communication quality information indicating quality of communication between the second base station and the mobile station; and
    a requesting unit configured to request to transmit the data from the second base station to the mobile station based on the result of the comparison by the determination unit.

5. A radio communication method for a first base station and a second base station to communicate with a mobile station, the first base station for communicating with the mobile station in a first area, the second base station for communicating with the mobile station in a second area, a part of the second area being same with the first area, the radio communication method comprising:
    transmitting the connection control information to the first base station, the connection control information including information indicating data to be sent from the second base station to the mobile station;
    receiving connection control information from the second base station;
    generating scheduling information for deciding whether the data sent to the mobile station is sent from the first base station or not, on the basis of the received connection control information and a communication resource that can be used to send data from the first base station to the mobile station;
    transmitting the generated scheduling information to the second base station and transmitting the data decided to send to the mobile station on the basis of the scheduling information;
    receiving the scheduling information from the first base station; and
    transmitting the data decided to send from the second base station to the mobile station based on the scheduling information.

* * * * *